US012600228B2

(12) United States Patent
Kaltenbach et al.

(10) Patent No.: US 12,600,228 B2
(45) Date of Patent: Apr. 14, 2026

(54) MOTOR VEHICLE TRANSMISSION FOR AN AT LEAST PARTIALLY ELECTRICALLY DRIVEN MOTOR VEHICLE

(71) Applicant: ZF Friedrichshafen AG, Friedrichshafen (DE)

(72) Inventors: Johannes Kaltenbach, Friedrichshafen (DE); Fabian Kutter, Kressbronn (DE); Thomas Martin, Weissensberg (DE); Johannes Glückler, Friedrichshafen (DE); Kai Bornträger, Langenargen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 19/069,331

(22) Filed: Mar. 4, 2025

(65) Prior Publication Data

US 2025/0282215 A1     Sep. 11, 2025

(30) Foreign Application Priority Data

Mar. 5, 2024    (DE) ..................... 10 2024 202 047.8

(51) Int. Cl.
F16H 3/64         (2006.01)
B60K 1/02         (2006.01)
B60K 17/08        (2006.01)

(52) U.S. Cl.
CPC ................ B60K 17/08 (2013.01); B60K 1/02 (2013.01); F16H 3/64 (2013.01); B60Y 2200/91 (2013.01); B60Y 2200/92 (2013.01);

*F16H 2200/0021* (2013.01); *F16H 2200/006* (2013.01); *F16H 2200/0073* (2013.01);
(Continued)

(58) Field of Classification Search
CPC .. B60K 17/08; B60K 1/02; B60K 1/00; F16H 3/64; F16H 3/66; F16H 2200/0021; B60Y 2200/92

See application file for complete search history.

(56) References Cited

U.S. PATENT DOCUMENTS

| 4,702,125 A | 10/1987 | Kalns |
| 11,999,237 B2 * | 6/2024 | Kaltenbach ............ B60K 6/365 |

(Continued)

FOREIGN PATENT DOCUMENTS

| DE | 10 2018 213 891 | 2/2020 |
| DE | 10 2021 120 791 | 3/2022 |

OTHER PUBLICATIONS

German Patent Office, German Search Report issued in German Patent application No. 10 2024 202 047.8 (Oct. 29, 2024).

*Primary Examiner* — Derek D Knight
(74) *Attorney, Agent, or Firm* — Finch & Maloney PLLC

(57)            ABSTRACT

A motor vehicle transmission (2) includes a first drive input shaft (9), a second drive input shaft (10), a first planetary gearset (P1), and a second planetary gearset (P2), where the drive input shafts (9, 10) are each designed to be coupled to a respective drive machine. Furthermore, at least functionally, three shifting elements are provided, in the form of a first shifting element (B), a second shifting element (D), and a third shifting element (E). Further, a drive unit (1), a motor vehicle drive axle, a hybrid or electric vehicle, and a method for operating a motor vehicle transmission are disclosed.

24 Claims, 10 Drawing Sheets

(52) U.S. Cl.
CPC ................ *F16H 2200/2007* (2013.01); *F16H 2200/201* (2013.01); *F16H 2200/2094* (2013.01)

(56) References Cited

U.S. PATENT DOCUMENTS

| 12,123,483 | B2 * | 10/2024 | Kaltenbach | ............... F16H 3/64 |
| 2021/0394607 | A1 | 12/2021 | Shim et al. | |

* cited by examiner

| | 25 | | 26 | | 3 | 4 |
|---|---|---|---|---|---|---|
| | A | B | D | E | | |
| I | X | | | X | G1 | G1 |
| II | X | | X | | G1 | ZG |
| III | | | X | | EDF | EDF |
| IV | | X | X | X | G2 | |
| V | | X | | | G2 | G2 |
| VI | X | | | | G1 | |
| VII | | X | | | G2 | |
| VIII | | | | X | G2 | |

Fig. 2

| | 38 | | | 26 | | 3 | 4 |
|---|---|---|---|---|---|---|---|
| | A | B | C | D | E | | |
| I' | X | | | | X | G1 | G1 |
| II' | X | | | X | | G1 | ZG |
| III' | | X | | X | | EDF | EDF |
| IV' | | | | X | | G2 | |
| V' | | X | | | X | G2 | G2 |
| VI' | | | X | X | X | G3 | G3 |
| VII' | | | X | | | G3 | G3 |
| VIII' | X | | | | | G1 | |
| IX' | | X | X | | | G2 | |
| X' | | | | | | G3 | |
| XI' | | | | | X | | |

Fig. 5

|  | 25 | | | | 3 | 4 |
| --- | --- | --- | --- | --- | --- | --- |
|  | A | B | D | E | | |
| I" | X | | | X | G1 | G1 |
| II" | X | | X | | G1 | ZG |
| III" | | | X | | EDF | EDF |
| IV" | | X | X | | G2 | |
| V" | | X | X | X | G2 | G2 |
| VI" | | | | X | G3 | G3 |
| VII" | X | | | | G1 | |
| VIII" | | X | | | G2 | |
| IX" | | | | X | | |

Fig. 7

|  | 55 | | 26 | | 3 | 4 |
|---|---|---|---|---|---|---|
|  | B | C | D | E | | |
| I' | X | | | X | G2 | G2 |
| II'' | X | | X | | G2 | |
| III''' | | | X | | EDF | EDF |
| IV'''' | X | X | | | G3 | |
| V''''' | | | | | G2 | |
| VI'''''' | | X | X | | G3 | G3 |
| VII''''''' | | X | | X | G3 | G3 |

Fig. 9

MOTOR VEHICLE TRANSMISSION FOR AN AT LEAST PARTIALLY ELECTRICALLY DRIVEN MOTOR VEHICLE

RELATED APPLICATIONS

This application claims the benefit of and right of priority under 35 U.S.C. § 119 to German Patent Application no. 10 2024 202 047.8, filed on 5 Mar. 2024, the contents of which are incorporated herein by reference in its entirety.

FIELD OF THE DISCLOSURE

The invention relates to a motor vehicle transmission for an at least partially electrically driven motor vehicle, comprising a first drive input shaft, an output shaft, a first planetary gearset, and a second planetary gearset, wherein the first drive input shaft is provided for coupling to a first drive machine, in particular a first electric machine, wherein the first planetary gearset and the second planetary gearset each comprises a first element, a second element, and a third element, respectively, in the form of a sun gear, a planetary carrier, and a ring gear, wherein at least functionally a first shifting element, a second shifting element, and a third shifting element are provided, wherein the first element of the first planetary gearset and the first element of the second planetary gearset are connected rotationally fixed to the first drive input shaft, wherein the second element of the second planetary gearset is connected rotationally fixed to the output shaft, wherein the second element of the first planetary gearset and the third element of the second planetary gearset are connected rotationally fixed to one another, and wherein the at least functionally provided first shifting element is designed, when actuated, to immobilize the third element of the first planetary gearset. Furthermore, the invention relates to a drive unit for an at least partially electrically driven motor vehicle, a motor vehicle drive axle for a hybrid or electric vehicle, and a method for operating a motor vehicle transmission and a drive unit.

BACKGROUND

In motor vehicles made as electric and hybrid vehicles, a motor vehicle transmission is usually provided in a respective drivetrain between at least one electric machine and drive wheels of the motor vehicle concerned, in order to be able to transmit a drive movement of the at least one electric machine, in particular in the slow range, to the drive wheels. Besides single-gear transmissions, usually motor vehicle transmissions in which two or more gears can be engaged are used.

U.S. Pat. No. 4,702,125 A discloses a drive unit of an electric vehicle, the drive unit consisting of a motor vehicle transmission and an electric machine, which is connected to a drive input shaft of the motor vehicle transmission. In addition, the motor vehicle transmission comprises two planetary gearsets, each consisting of a sun gear, a planetary carrier, and a ring gear. Moreover, in a variant of the motor vehicle transmission according to U.S. Pat. No. 4,702,125 A three shifting elements are provided by the selective actuation of which various power flow paths between the drive input shaft and an output shaft can be produced. The output shaft is then coupled to a differential gearset by way of a further planetary gearset.

SUMMARY

Starting from the above-described prior art, it is now the purpose of the present invention to provide a motor vehicle transmission by means of which two drive machines can be connected in a suitable manner.

This objective is achieved by the characterizing features of a motor vehicle transmission as disclosed herein. A drive unit in which a motor vehicle transmission according to the invention is provided is also disclosed. Furthermore, the present disclosure relates to a motor vehicle drive axle for a hybrid or electric vehicle, as well as to a hybrid or electric vehicle. Finally, the present disclosure relates to a method for operating a motor vehicle transmission according to the invention and to a method for operating a drive unit. Advantageous features and embodiments will be apparent in light of the present disclosure.

According to the invention, the motor vehicle transmission comprises a first drive input shaft, an output shaft and first and second planetary gearsets. The first drive input shaft is provided for coupling to a first drive machine, in particular a first electric machine. In addition, the first planetary gearset and the second planetary gearset each comprise a first element, a second element, and a third element, respectively in the form of a sun gear, a planetary carrier, and a ring gear in each case, and furthermore, at least functionally, a first shifting element, a second shifting element, and a third shifting element are provided. The first element of the first planetary gearset and the first element of the second planetary gearset are connected rotationally fixed to the first drive input shaft, while in contrast the second element of the second planetary gearset is connected rotationally fixed to the output shaft. In addition, the second element of the first planetary gearset and the third element of the second planetary gearset are connected rotationally fixed to one another. The at least functionally provided first shifting element is designed, when actuated, to immobilize the third element of the first planetary gearset.

In the context of the invention, "axial" means an orientation in the direction of a central longitudinal axis of the motor vehicle transmission, parallel to which rotation axes of shafts of the motor vehicle transmission and of the elements of the planetary gearsets are also orientated. "Radial" is then understood to mean an orientation in the direction of the diameter of any component of the transmission, in particular a shaft or an element of the planetary gearsets.

The first planetary gearset and the second planetary gearset each consist of a first element, a second element, and a third element, and the elements of the respective planetary gearset consist of a sun gear, a planetary carrier, and a ring gear in each case. Particularly preferably, the first and second planetary gearsets are minus planetary gearsets in which the planetary carrier in each case guides at least one planetary gearwheel rotatably and the at least one planetary gearwheel meshes both with the sun gear and with the ring gear concerned. When the first and second planetary gearsets are in the form of minus planetary gearsets, then the first element of each planetary gearset is its sun gear, the second element is its planetary carrier, and the third element is its ring gear.

Alternatively, however, in principle the first planetary gearset and/or the second planetary gearset could be in the form of plus planetary gearsets. In that case, in the planetary gearset or gearsets concerned at least one pair of planetary gearwheels is mounted rotatably on the planetary carrier, of which pair one planetary gearwheel meshes with the sun gear and one with the ring gear, and in addition the planetary gearwheels of each pair mesh with one another. Other than in the design as minus planetary gearsets, in that case the first element of each planetary gearset is preferably the sun gear, the second element is the ring gear, and the third element is the planetary carrier. Compared with the design as minus planetary gearsets, a stationary transmission ratio of the planetary gearset concerned has to be increased by one. As already described earlier, however, in the context of the present invention both the first and the second planetary gearsets are preferably in the form of minus planetary gearsets.

The invention is now based on the technical principle that a second drive input shaft is provided, which serves to be coupled to a second drive machine, in particular a second electric machine. The at least functionally provided second shifting element is designed, when actuated, to connect the second drive input shaft rotationally fixed to the third element of the first planetary gearset, while in contrast the at least functionally provided third shifting element is designed, when actuated, to bring the second drive input shaft into rotationally fixed connection with the first drive input shaft.

In the context of the invention, a "shaft", such as a respective drive input shaft or the output shaft, is understood to be a rotatable component of the transmission by way of which a power flow between components can be produced, if necessary, by virtue of the simultaneous actuation of an at least functionally provided shifting element. The shaft concerned can connect the components to one another axially or radially, or even both axially and radially. Thus, the shaft concerned can also be present in the form of an intermediate component by means of which a particular component can be connected for example purely radially. Furthermore, depending on its shape and connection or ability to be connected to the components, the shaft can be made as a solid shaft, a hollow shaft, or a partially solid and partially hollow shaft. Alternatively, or in addition, the shaft concerned can be made as one part or of more that one part.

The motor vehicle transmission according to the invention has a first drive input shaft and a second drive input shaft, wherein in particular the two shafts are coaxial with one another. In particular, the first drive input shaft and the second drive input shaft are each associated with a part-transmission of the transmission, by way of which a power flow can be produced, starting from the drive input shaft concerned, to the output shaft. The power flow concerned is preferably produced by the selective actuation of the at least functionally provided shifting elements.

In the motor vehicle transmission according to the invention, the first drive input shaft and the second drive input shaft are provided in each case to form a coupling on the drive input side to a respective drive machine, wherein each drive input shaft preferably serves to form the coupling concerned to just one drive machine in each case. For that purpose, each drive input shaft is in particular provided with a respective connection point at which the coupling of the drive input shaft to the associated drive machine can be formed. In the installed condition of the motor vehicle transmission the connection of the associated drive machine to the respective drive input shaft is in particular permanent, preferably when the drive machine is an electric machine. Alternatively however, in each case an intermediate starting element such as a hydrodynamic torque converter, a starter clutch, etc. can be provided, by way of which the drive input shaft concerned is or can be coupled to its associated upstream drive machine at its respective connection point. This is done m particular when the associated drive machine is in the form of an internal combustion engine.

The coupling between the associated drive machine and the respective drive input shaft is preferably in a form such that in the installed condition of the motor vehicle transmission, and when the coupling has been formed, a rotation speed of the drive input shaft of the motor vehicle transmission and a rotation speed of the associated drive machine are always in a fixed rotation speed ratio. Thus, in the context of the invention, a further transmission ratio step such as a spur gear stage and/or a planetary gearset can be provided, if necessary, between the drive input shaft concerned and its associated drive machine, by virtue of which a preliminary transmission ratio of a rotation movement of the associated drive machine can be obtained at the drive input shaft. Preferably, however, the drive input shaft concerned is in rotationally fixed connection with the associated drive machine.

The motor vehicle transmission is in particular a hybrid or electric vehicle transmission, which is provided in order to be coupled via the respective drive input shaft to a drive machine in the form of an electric machine in each case. As described earlier, a rotor of the electric machine concerned can be coupled to its associated drive input shaft of the motor vehicle transmission by way of at least one intermediate transmission ratio step. Particularly preferably, however, in the installed condition of the motor vehicle transmission according to the invention, the rotor of the electric machine concerned is connected rotationally fixed to the associated drive input shaft.

In the motor vehicle transmission according to the invention, the output shaft is provided in particular to form a coupling of the motor vehicle transmission on its output side to components which, in the installed condition of the motor vehicle transmission, come after the motor vehicle transmission in the power flow direction as far as the drive wheels of the motor vehicle. Accordingly, the motor vehicle transmission according to the invention is a driving transmission by way of which the associated drive machine can be connected to drive wheels of the motor vehicle concerned in order to transmit a drive movement produced by the drive machine, via various gear ratios, to the drive wheels.

Preferably, the output shaft is coupled to an input element of a differential gearset which couples the output shaft to two drive output shafts. In that way, the output shaft is coupled to the two drive output shafts via the differential gearset. Advantageously, this enables a drive torque applied to the output shaft to be divided between the two drive output shafts, while by way of the differential gearset a rotation speed equalization is also brought about between the two drive output shafts. In this case, the differential gearset functions specifically as a transverse differential and is preferably designed as a bevel gear differential. By means of the transverse differential so formed, preferably a distribution of the drive movement transmitted to the output shaft between the drive output shafts takes place, the shafts preferably being associated with a motor vehicle drive axle. However, the differential gearset can also function as a longitudinal differential by means of which a drive power can be distributed to a plurality of drive axles. Alternatively, to a design in the form of a bevel gear differential, in the context of the invention, the differential gearset can be designed as a planetary gearset differential, a spur gear differential, etc.

The input element by which the output shaft is coupled is preferably a differential cage of the differential gearset. When the differential gearset is used as a transverse differential, and the motor vehicle transmission is installed transversely to the direction of travel of the motor vehicle concerned, the output shaft is preferably connected rotationally fixed to the input element. This in particular is done when the differential gearset functions as a longitudinal differential and the motor vehicle transmission is orientated in the travel direction of the motor vehicle. In contrast, with the preferred installation of the motor vehicle transmission in the travel direction, and the use of the differential gearset as a transverse differential, the output shaft is in particular coupled to the input element via a bevel gear drive. Such a bevel gear drive is also preferably used when the differential gearset is a longitudinal differential and the motor vehicle transmission is installed transversely to the travel direction.

In the motor vehicle transmission according to the invention, the drive input shafts and the output shaft are in particular arranged coaxially with one another and it is also preferred that the planetary gearsets are positioned coaxially with the drive input shafts and the drive output shaft. This results in a particularly compact structure of the motor vehicle transmission in the radial direction.

In the motor vehicle transmission according to the invention, the first element of the first planetary gearset, the first element of the second planetary gearset, and the first drive input shaft are permanently connected rotationally fixed to one another, whereby the first element of the first planetary gearset, the first element of the second planetary gearset, and the first drive input shaft always rotate together. Furthermore, the second element of the first planetary gearset and the third element of the second planetary gearset are permanently connected rotationally fixed to one another, which means that the second element of the first planetary gearset and the third element of the second planetary gearset always rotate together. There is also a permanent rotationally fixed connection between the output shaft and the second element of the second planetary gearset, whereby the output shaft and the second element of the second planetary gearset always rotate together.

An actuated state of the at least functionally provided first shifting element results in immobilization of the third element of the first planetary gearset, whereby the third element of the first planetary gearset is then prevented from rotating. If, in contrast, the at least functionally provided second shifting element is in an actuated state, then the second drive input shaft and the third element of the first planetary gearset are connected rotationally fixed to one another, so that the second drive input shaft and the third element of the first planetary gearset rotate together. An actuated state of the at least functionally provided third shifting element produces a rotationally fixed connection between the two drive input shafts, so that the two drive input shafts rotate together.

The motor vehicle transmission according to the invention comprises, at least functionally, a first shifting element, a second shifting element, and a third shifting element, by the selective actuation of which various power flow paths can be produced in the motor vehicle transmission according to the invention. In the context of the invention, to engage different gears just these three shifting elements are present, at least functionally, although preferably at least one further shifting element is provided at least functionally for the engagement of further gears. That a particular shifting element is provided "at least functionally" means, in the context of the invention, that in the motor vehicle transmission according to the invention at least the particular function of the shifting element concerned can be reproduced. The shifting elements can individually be actually present in the form of individual shifting elements, or their function is reproduced by some other component such as a shifting device. In this context the component that reproduces the function can combine the functions of two or more shifting elements in a single device.

The design of a motor vehicle transmission in accordance with the invention has the advantage that a structure of the motor vehicle transmission is thereby achieved in which various coupling options of the two drive input shafts with the output shaft are available, and whereby in the installed condition of the motor vehicle transmission suitable connections of the drive machines connected to the drive input shafts are also possible.

Thus, the motor vehicle transmission according to the invention can be operated in such manner that a gear can be engaged between the first drive input shaft and the output shaft when the first shifting element is in its actuated state. If in this case only the first shifting element is in its actuated state, then also only the first drive machine coupled to the first drive input shaft is connected, whereas the second drive machine is decoupled. However, the gear can be engaged between both drive input shafts and the output shaft and thereby additionally used by the drive machine coupled to the second drive input shaft if, at the same time as the first shifting element is actuated, the third shifting element is actuated as well.

Furthermore, with the motor vehicle transmission according to the invention a superimposition operating mode can be produced by virtue of the planetary gearsets, in which the two drive input shafts are coupled to the output shaft via the first planetary gearset and the second planetary gearset. For this, only the second shifting element has to be actuated. However, this superimposition operation can also be used to connect the drive machines connected to the drive input shafts in order to obtain a more prolonged driving operation. For example, if the drive machines connected to the drive input shafts have equal rotation speeds, then the two planetary gearsets rotate as a block so that a direct through-drive from the drive input shafts to the output shaft is obtained. In that way, in the superimposition mode a direct gear of the motor vehicle transmission could be produced.

In the context of the invention, a permanent "rotationally fixed" connection of components of the transmission is understood to mean that the components are connected to one another or are in connection with one another in a rotationally fixed manner, and therefore that they always have the same rotation speed. The components connected to or in connection with one another in a rotationally fixed manner can be separate components joined to one another. Alternatively, the components connected to or in connection with one another in a rotationally fixed manner can also be made integrally as one piece and therefore constitute together a single component, this being done in particular when the components are arranged spatially close to one another.

In the context of the invention, an immobilized condition of a component of the motor vehicle transmission is produced in particular by a rotationally fixed connection to a component fixed to the housing, namely, either to the housing of the motor vehicle transmission, or to part of the housing or to a component permanently connected rotationally fixed thereto.

In the context of the invention, the fixing of a component of the motor vehicle transmission by means of an at least functionally provided shifting element, or a rotationally fixed connection between components of the motor vehicle transmission by means of an at least functionally provided shifting element, means that the component is not permanently fixed, or that the components are not permanently coupled to one another, but rather, that fixing or a rotationally fixed connection is only produced when an at least functionally provided intermediate shifting element is in its actuated state. In the context of the invention, an actuated state of the shifting element concerned means that the shifting element has been changed to its closed condition and consequently that the rotation movements of the components connected directly thereto are equalized. In this case, if at least the function of an interlocking shifting element is reproduced, then the components connected to one another by the shifting element will rotate at the same rotation speed, whereas if at least the function of a frictional shifting element is reproduced, then even in the actuated state of the shifting element there may be rotation speed differences between the components. Nevertheless, in the context of the invention that desired or undesired condition is said to be a rotationally fixed connection of the components concerned by means of the at least functionally provided shifting element.

In an embodiment of the invention, a further shifting element is at least functionally provided, which is designed, when in its actuated state, to immobilize the second element of the first planetary gearset and the third element of the second planetary gearset. Thus, actuation of the at least functionally provided further shifting element results in the conjoint immobilization of the second element of the first planetary gearset and the third element of the second planetary gearset, so that both are prevented from rotating.

In a motor vehicle transmission designed in accordance with the above embodiment, a further gear can then be engaged between the first drive input shaft and the output shaft by actuating the further shifting element. In that way, the first drive input shaft is coupled to the output shaft by way of the second planetary gearset. If the second shifting element and also the third shifting element are not actuated, then again only the first drive machine connected to the first drive input shaft is coupled to the output shaft, whereas the second drive machine is decoupled. However, the further gear can also be used for both drive machines at the same time, for which purpose the second and third shifting elements are actuated at the same time.

At the same time as the further gear engaged between the first drive input shaft and the output shaft, however, an intermediate gear between the second drive input shaft and the output shaft can be engaged by the simultaneous actuation of the further shifting element and the second shifting element. In that way, the second drive input shaft is coupled via the first planetary gearset to the first drive input shaft and thereby, in addition, also coupled to the output shaft via the second planetary gearset, whereby in relation to the second drive input shaft, that coupling has a lower gear ratio than in the gear and the further gear.

In a further development of the aforesaid embodiment, the first shifting element and the further shifting element are formed by a common shifting device which comprises a coupling element. This coupling element can be changed to a first shift position and to a second shift position, such that in its first shift position the coupling element functionally reproduces the actuated state of the first shifting element and immobilizes the third element of the first planetary gearset. In a second shift position, in contrast, the coupling element functionally reproduces the actuated state of the further shifting element and immobilizes the second element of the first planetary gearset and the third element of the second planetary gearset. Thus, in that case the function of the first shifting element and that of the further shifting element are both reproduced by a single shifting device, and this enables a particularly compact arrangement. Furthermore, in that way a single actuator device can be provided for actuating the shifting elements, by means of which device the coupling element can be changed to its different shift positions. Preferably, in addition to the two shift positions the coupling element can also be moved to a neutral position in which neither an actuated state of the first shifting element nor an actuated state of the further shifting element are produced by the shifting device.

Preferably, in its two shift positions and when displaced axially between its two shift positions the coupling element is guided in a rotationally fixed but axially displaceable manner on a first tooth array which is immobilized and therefore permanently static. In its first shift position, the coupling element, while still engaged with the first tooth array, then engages with a second tooth array which is connected rotationally fixed to the third element of the first planetary gearset. Furthermore, in its second shift position, the coupling element, while still engaged with the first tooth array, engages in a third tooth array which is in rotationally fixed connection with the second element of the first planetary gearset and the third element of the second planetary gearset. Particularly preferably, the coupling element of the shifting device is in the form of a sliding sleeve and the teeth are also preferably in the form of claw teeth, so that by means of the shifting device the function of unsynchronized claw-type shifting elements is reproduced. In the context of the invention, however, the first shifting element and the further shifting element could also be in the form of individual shifting elements, in which case the first shifting element and the further shifting element can each be interlocking shifting elements such as claw-type shifting elements or locking synchronizers, or in the form of frictional shifting elements such as disk-type shifting elements.

According to a possible embodiment of the invention, an additional shifting element is provided at least functionally, which is designed when in an actuated state to connect two of the elements of the first planetary gearset rotationally fixed to one another or to bring two of the elements of the second planetary gearset into rotationally fixed connection with one another, or to connect the third element of the first planetary gearset rotationally fixed to the third element of the second planetary gearset. In each case this results in blocking of the two planetary gearsets, since the blocking of one planetary gearset owing to the coupling of the planetary gearsets with one another also results in blocking of the other planetary gearset, or a rotationally fixed connection of another element of the first planetary gearset to another element of the second planetary gearset by virtue of the already existing connections between the planetary gearsets, and likewise a conjoint block rotation of the two planetary gearsets.

As a result, in the motor vehicle transmission an additional gear can then be engaged between the first drive input shaft and the output shaft if the additional shifting element is actuated. This is because in that way the first drive input shaft is connected rotationally fixed to the output shaft by the two blocked planetary gearsets so that a solid straight-through drive from the first drive input shaft to the output shaft is produced. If neither the second nor the third shifting element are actuated, then only the first drive machine connected to the first drive input shaft is coupled to the output shaft in the additional gear, whereas the second drive machine is decoupled. However, the additional gear can also at the same time be engaged between the second drive machine and the output shaft if the additional shifting element and the second shifting element are actuated simultaneously.

If the motor vehicle transmission according to the invention comprises both the further shifting element and also the additional shifting element, then the first shifting element, the further shifting element and the additional shifting element can be combined in a common shifting device which comprises a coupling element. The coupling element can be moved to a first shift position, a second shift position, and a third shift position, such that in its first shift position the coupling element functionally reproduces the actuated state of the further shifting element and immobilizes the second element of the first planetary gearset and the third element of the second planetary gearset. In its second shift position, the coupling element functionally reproduces the actuated state of the first shifting element and immobilizes the third element of the first planetary gearset, while in contrast, in its third shift position, the coupling element functionally reproduces the actuated state of the additional shifting element and connects the second element of the first planetary gearset and the third element of the second planetary gearset rotationally fixed to the third element of the first planetary gearset. Advantageously, in that way the functions of the three shifting elements are reproduced by a single shifting device whereby on the one hand a particularly compact structure can be produced and on the other hand only one shift actuator is required for obtaining the shift positions. In particular, besides the shift positions the coupling element can also be moved to neutral positions between them, in which neither the first, nor the further, nor the additional shifting element is/are actuated.

In particular, the coupling element of the shifting device described immediately above, in its first and second shift positions and when moved axially between its first and second shift positions, is guided in a rotationally fixed and axially displaceable manner on a first tooth array which is static. While still engaged with the first tooth array the coupling element in its first shift position additionally engages with a second tooth array which is connected rotationally fixed to the second element of the first planetary gearset and the third element of the second planetary gearset. In its second shift position, the coupling element, while still engaged with the first tooth array, additionally engages with a third tooth array which is connected rotationally fixed to the third element of the first planetary gearset, whereby when moved axially between its second and third shift positions the coupling element is then consequently guided on the third tooth array in a rotationally fixed and axially displaceable manner. In its third shift position, while still engaged with the third tooth array, the coupling element additionally engages with the second tooth array.

Again, in the variant described above the coupling element of the shifting device is in particular in the form of a sliding sleeve and the teeth are in particular in the form of claw teeth, so that by means of the shifting device, the function of unsynchronized claw-type shifting elements is reproduced. Alternatively, however, the first shilling element, the further shifting element, and the additional shifting element can also be individual shifting elements. In that case the first shifting element, the further shifting element, and the additional shifting element can be interlocking shifting elements such as claw-type shifting elements or locking synchronizers, or they can be frictional shifting elements such as disk-type shifting elements.

If the additional shifting element is present in the motor vehicle transmission and either the further shifting element which, when actuated, immobilizes the second element of the first planetary gearset and the third element of the second planetary gearset, is not present or, however, is in the form of an individual shifting element, then the first shifting element and the additional shifting element can be formed by a common shifting device. That shifting device then has a coupling element which can be moved to a first shift position and to a second shift position. In its first shift position, the coupling element reproduces the function of the first shifting element when it is actuated, thereby immobilizing the third element of the first planetary gearset, whereas in contrast, when the coupling element is in its second shift position, it reproduces the actuated state of the additional shifting element and connects the second element of the first planetary gearset rotationally fixed to the third element of the second planetary gearset and to the third element of the first planetary gearset. This makes possible a compact structure of the motor vehicle transmission in which, furthermore, a common actuator can be provided in order to obtain the actuated states of the first shifting element and the additional shifting element Preferably, besides its two shift positions the coupling element can also be move to a neutral position in which the shifting device produces neither an actuated state of the first shifting element nor an actuated state of the further shifting element.

In a further development, the coupling element of the aforesaid shifting device, in both of its shift positions and when moved axially between them, is guided in a rotationally fixed but axially displaceable manner by a first tooth array which is connected rotationally fixed to the third element of the first planetary gearset. In its first shift position, while still engaged with the first tooth array the coupling element also engages with a second tooth array, which is static. In contrast, in its second shift position the coupling element, while still engaged with the first tooth array, additionally engages with a third tooth array which is connected rotationally fixed to the second element of the first planetary gearset and the third element of the second planetary gearset. Particularly preferably, the coupling element of the shifting device is in the form of a sliding sleeve, and also preferably the teeth are in the form of claw teeth so that by means of the shifting device the function of unsynchronized claw-type shifting elements is reproduced. In the context of the invention, however, the first shifting element and the additional shifting element could also be individual shifting elements, and in that case a design as interlocking shifting elements such as claw-type shifting elements or locked synchronizers, or even as frictional shifting elements, in particular disk-type shifting elements, would be conceivable.

It is an advantageous embodiment of the invention that the second and third shifting elements are formed by a common shifting device with a coupling element. In this case the coupling element of the shifting device can be moved to a first and a second shift position, such that in its first shift position the coupling element functionally reproduces the actuated state of the second shifting element and connects the second drive input shaft rotationally fixed to the third element of the first planetary gearset, and in its second shift position the coupling element functionally reproduces the actuated state of the third shifting element and brings the second drive input shaft into rotationally fixed connection with the first drive input shaft. Advantageously, in that way the functions of the second and third shifting elements are reproduced by the shifting device, whereby besides forming a compact arrangement, only one actuator is required. In particular, besides the two shift positions the coupling element can also be moved to a neutral position in which neither the actuated state of the second shifting element, nor that of the third shifting element is produced by the shifting device.

Preferably, in the embodiment the coupling element, when in the two shift positions and when moving axially between them, is guided rotationally fixed and axially displaceably on a first tooth array which is connected rotationally fixed to the second drive input shaft. When the coupling element is moved to its first shift position, then while still engaged with the first tooth array the coupling element also engages with a second tooth array which is connected rotationally fixed to the third element of the first planetary gearset. In its second shift position, while still engaged with the first tooth array the coupling element also engages with a third tooth array which is connected rotationally fixed to the first drive input shaft. In this case, very particularly preferably the coupling element of the shifting device is in the form of a sliding sleeve and the tooth arrays are specifically in the form of claw teeth, so that the shifting device reproduces the function of unsynchronized claw-type shifting elements. Alternatively, however, the second and third shifting elements can also be in the form of individual shifting elements. In that case the second and third shifting elements can be in the form of interlocking shifting elements such as claw-type shifting elements or locking synchronizers, or in the form of frictional shifting elements, for example disk-type shifting elements.

Particularly preferably, in the motor vehicle transmission according to the Invention, the shifting elements to be provided are where possible combined into shifting devices so that the functions of the respective shifting elements to be provided can be performed by the shifting devices by means of their associated coupling elements. This makes for a particularly compact structure of the motor vehicle transmission. In the context of the invention, the particular "shift position" or the particular "neutral position" of the coupling element concerned can be associated with a discrete axial position of the coupling element, wherein however the "shift position" or the "neutral position" is defined by an axial positional range within which the coupling element must be located in order to correspond to the shift position or the neutral position concerned.

In the context of the invention, however, a design possibility of the motor vehicle transmission is also conceivable in which the second shifting element and the third shifting element are in the form of individual shifting elements. In that way the second and third shifting elements can both be actuated simultaneously and thereby, by connecting the first and third elements of the first planetary gearset rotationally fixed to one another both planetary gearsets can be blocked. Consequently, the two drive input shafts are connected rotationally fixed to the output shaft, whereby a solid through-drive of the drive input shafts to the output shaft can be obtained in an additional gear.

Preferably, the first planetary gearset is arranged axially between the second planetary gearset on the one side and the connection points at which the couplings of the drive input shafts to the drive machines are to be formed on the other side. Thus, in that case the second planetary gearset is arranged on one axial side of the first planetary gearset and the connection points where the drive input shafts are to be coupled to the respectively associated drive machines are on the other axial side of the first planetary gearset.

A further embodiment of the invention is one in which, in addition, a further, third planetary gearset is provided, which comprises a first element, a second element, and a third element, respectively in the form of a sun gear, a planetary carrier, and a ring gear. In this case one of the elements of the third planetary gearset is connected rotationally fixed to the output shaft, one of the elements of the third planetary gearset is connected rotationally fixed to a drive output shaft, and one of the elements of the third planetary gearset is immobilized. Advantageously, in that way an additional transmission ratio of a drive movement applied to the output shaft can be produced.

Particularly preferably, the third planetary gearset is in the form of a minus planetary gearset in which the planetary carrier guides at least one planetary gearwheel rotatably, the at least one planetary gearwheel meshing both with the sun gear and with the ring gear of the third planetary gearset. When the third planetary gearset is in the form of a minus planetary gearset, the first element of the third planetary gearset is in particular its sun gear, the second element of the third process gearset is its planetary carrier, and the third element of the third planetary gearset is its ring gear.

Alternatively, however, the third planetary gearset could be in the form of a plus planetary gearset. In that case at least one pair of planetary gearwheels is mounted rotatably on the planetary carrier of the third planetary gearset, and of the planetary gearwheels one meshes with the sun gear of the third planetary gearset and one with the ring gear thereof. In addition, the planetary gearwheels of the at least one gearwheel pair mesh with one another. Other than in the design as a minus planetary gearset, in this case preferably the first element of the third planetary gearset is the sun gear but its second element is the ring gear, and the third element is its planetary carrier. Furthermore, compared with the design as a minus planetary gearset, a stationary transmission ratio of the third planetary gearset must be increased by one.

Very particularly preferably, in the third planetary gearset the first element is connected to the output shaft, while the second element of the third planetary gearset is connected rotationally fixed to the drive output shaft and the third element of the third planetary gearset is permanently immobilized.

An object of the invention is also a drive unit which, besides a first electric machine and a second electric machine, also comprises a motor vehicle transmission according to any of the variants described above. A rotor of the first electric machine is coupled to the first drive input shaft of the motor vehicle transmission, while a rotor of the second drive machine is coupled to the second drive input shaft. In the context of the invention, each electric machine can be operated on the one hand as a generator and on the other hand as an electric motor. In that way a drive unit can be provided, which is suitable for use in a motor vehicle in the form of an electric vehicle or a hybrid vehicle. The two electric machines can be of a size such that their powers are equal, but preferably the second electric machine is designed to have a lower power than the first electric machine. Accordingly, the first electric machine is a main drive machine whereas the second electric machine is regarded as an auxiliary drive machine.

Particularly preferably, the first electric machine is arranged coaxially with the first drive input shaft and the rotor of the first electric machine is connected rotationally fixed to the first drive input shaft. In that way, during operation the first drive input shaft and the rotor of the first electric machine rotate at the same rotation speed. Alternatively, however, it is also conceivable that the rotor of the first electric machine is coupled to the first drive input shaft by way of a gear ratio step.

Alternatively preferred, but in addition thereto, in a drive unit according to the invention the second electric machine is arranged coaxially with the second drive input shaft of the motor vehicle transmission, and the rotor of the second electric machine is connected rotationally fixed to the second drive input shaft. Accordingly, during operation the rotor of the second electric machine and the second drive input shaft of the motor vehicle transmission rotate at the same rotation speed. Alternatively, however, the rotor of the second electric machine could be coupled to the second drive input shaft by way of at least one intermediate gear ratio step.

With a drive unit as described above, it is possible to switch between a condition of the motor vehicle transmission in which the gear between the two drive input shafts and the output shaft is engaged, and a condition in which the superimposition operating mode is used in the motor vehicle transmission and powershifting is possible. For that purpose, on the one hand a switch-over is carried out between the second shifting element and the third shifting element and to do that the rotation speeds in the third shifting element and the second shifting element are synchronized by means of the second electric machine and a traction force is supported by the first electric machine. On the other hand, the first shifting element is changed from its actuated to its inactivated condition and for that a load-free condition of the first shifting element is produced by interaction of the two electric machines. Depending on whether a switch-over is carried out from the gear to the superimposition operating mode or, conversely, from the superimposition mode to the gear, the step of switching between the second shifting element and the third shifting element precedes or succeeds the step of changing between the actuated and the inactivated condition of the first shifting element.

In a further development of the invention, between the condition in which the superimposition mode is used in the motor vehicle transmission and a condition in which, in the motor vehicle transmission, the further gear between the two drive input shafts and the output shaft is engaged, powershifting is also possible if, on the one hand a switch is made between the second shifting element and the third shifting element, and to do that a rotation speed synchronization is carried out by the second electric machine while a fraction force is supported by the first electric machine. On the other hand, the further shifting element is changed from its actuated to its inactivated state, and for that a load-free condition is produced in the further shifting element by interaction between the two electric machines. In this case as well, a time sequence of the steps depends on whether a change is to be made from the superimposition operating mode to the further gear or from the further gear to the superimposition mode. Furthermore, this further development can preferably precede a switch-over between the gear and the superimposition operating mode, so as to be able by way of the intermediate superimposition operating mode to powershift between the gear and the further gear.

Alternatively, or in addition to the aforesaid further development, a powershift is carried out between the condition in which the superimposition mode is used in the motor vehicle transmission and a condition in which the additional gear between the two drive input shafts and the output shaft is engaged, if a change is made between an actuated condition and an inactive condition of the additional shifting element, and for that a load-free condition of the additional shifting element is produced by interaction between the two electric machines. In addition, a switch-over can be carried out between the second shifting element and the third shifting element, and for that a rotation speed synchronization is carried out between the third and the second shifting elements by means of the second electric machine and a traction force is supported by the first electric machine. In this case, the sequence in time of the steps depends on whether the change takes place from the superimposition operating mode to the additional gear or from the additional gear to the superimposition mode. Furthermore, this further development can in particular come after a switch-over between the gear and the superimposition mode, so as to be able to change between the gear and the additional gear under load by virtue of the intermediate superimposition operating mode.

A drive unit that corresponds to one or more of the above variants is in particular part of a motor vehicle drive axle which in this case is provided for an electric vehicle or a hybrid vehicle. Preferably the drive unit is arranged in the same plane as drive output shafts which, respectively, are associated with at least one drive wheel and are coupled to the output shaft of the motor vehicle transmission. Advantageously, in that way a more compact structure of a motor vehicle drive axle with the drive unit can be produced, wherein the coupling between the output shaft of the motor vehicle transmission and the drive output shafts of the motor vehicle drive axle is in particular completed by a differential gearset.

In the context of the invention at least one such motor vehicle drive axle is produced in a hybrid or electric vehicle, which vehicle can be a passenger car or a utility vehicle. A utility vehicle can in this case be in the form of an at least partially electrically driven transporter or a light to medium-weight bus or truck.

BRIEF DESCRIPTION OF THE DRAWINGS

Advantageous embodiments of the invention, which will be described in what follows, are illustrated in the drawings, which show:

FIG. 2: A table showing various functions of the drive unit in FIG. 1;

FIG. 5: A table showing various functions of the drive units in FIGS. 3 and 4;

FIG. 7: A table showing various functions of the drive unit in FIG. 6;

FIG. 9: A table showing various functions of the drive unit in FIG. 8, and

DETAILED DESCRIPTION

Figure 1:
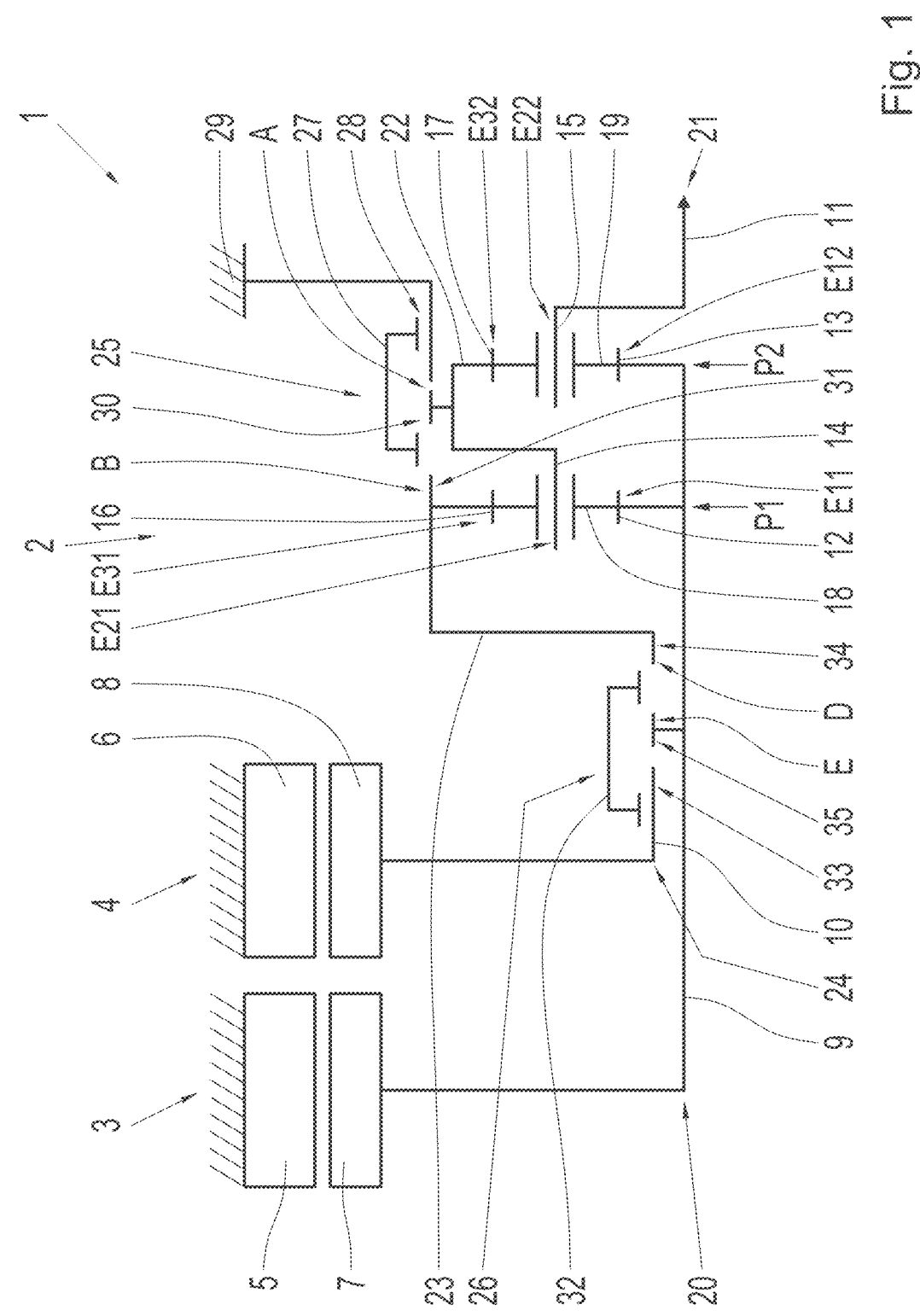
FIG. 1: A schematic view of a drive unit according to an embodiment of the invention.

FIG. 1 shows a schematic view of a drive unit 1 designed in accordance with an embodiment of the invention. This drive unit 1 consists of a motor vehicle transmission 2 and two electric machines 3 and 4, wherein the motor vehicle transmission 2 in this case is designed in accordance with a first embodiment of the invention. In a manner whose principle is familiar to those with a knowledge of the subject, the two electric machines 3 and 4 each comprise a stator 5 or 6 and a rotor 7 or 8 respectively, wherein the individual electric machines 3 and 4 can be operated on the one hand as generators and on the other hand as electric motors.

The motor vehicle transmission 2 comprises a first drive input shaft 9, a second drive input shaft 10 and two planetary gearsets P1 and P2, each consisting respectively of a first element E11 or E12, a second element E21 or E22 and a third element E31 or E32. In this case the respective first element E11 or E12 of the planetary gearset P1 or P2 concerned is a sun gear, while the respective second element E21 or E22 of the planetary gearset P1 or P2 concerned is in the form of a planetary carrier 14 or 15. In addition the respective third element E31 or E32 of the process gearset P1 or P2 concerned is a ring gear of the planetary gearset P1 or P2.

On the respective planetary carriers 14 or 15 of the planetary gearset P1 or P2 concerned, in each case at least one planetary gearwheel 18 or 19 is mounted to rotate, this planetary gearwheel meshing with the respective sun gear 12 or 13 and with the respective ring gear 16 or 17 of the planetary gearset P1 or P2 concerned. Accordingly, in this case the planetary gearsets P1 and P2 are designed as minus planetary gearsets.

In the present case both the first element E11 of the first planetary gearset P1 and also the first element E12 of the second planetary gearset P2 are connected rotationally fixed to the first drive input shaft 9, which is also connected rotationally fixed at a connection point 20 to the rotor 7 of the electric machine 3. Thus, the first element E11 of the first planetary gearset P1, the first element E12 of the second planetary gearset P2 and the rotor 7 are also connected rotationally fixed to one another by way of the first drive input shaft 9, so that the first element E11 of the first planetary gearset P1, the first element E12 of the second planetary gearset P2 and the rotor 7 always rotate at the same rotation speed. In the context of the invention, the first drive input shaft 9 can be made integrally with the first element E11 of the first planetary gearset P1 and/or with the first element E12 of the second planetary gearset P2 and/or with the rotor 7 of the electric machine 3.

The output shaft 11 is connected rotationally fixed to second element E22 of the second planetary gearset P2, and the output shaft 11 also has a connection point 21 at which the output shaft 11 is preferably coupled to a downstream differential gearset. Furthermore, the second element E21 of the first planetary gearset P1 and the third element E32 of the second planetary gearset P2 are connected rotationally fixed to one another by way of a shaft 22, wherein the shaft 22 can if desired be made integrally with the second element E21 of the first planetary gearset P1 and/or with the third element E32 of the second planetary gearset P2.

The third element E31 of the first planetary gearset P1 is permanently connected rotationally fixed to a shaft 23, so that the shaft 23 and the third element E31 of the first planetary gearset P1 always rotate at the same rotation speed. Thus, the third element E31 of the first planetary gearset P1 could also be made integrally with the shaft 23. Moreover, the second drive input shaft 10 is connected rotationally fixed to the rotor 8 of the electric machine 4, so that the second drive input shaft 10 and the rotor 8 always rotate at the same rotation speed. The rotationally fixed connection in this case is made at a connection point 24 of the second drive input shaft 10, so that in the context of the invention the second drive input shaft 10 and the rotor 8 of the electric machine 4 could also be made integrally.

The motor vehicle transmission 2 also has two shifting devices 25 and 26. In the shifting device 25 a coupling element 27 in the form of a sliding sleeve is provided, which is guided in a rotationally fixed and axially displaceable manner on a tooth array 28 which is connected rotationally fixed to a component 29 fixed to the housing. In this case the component 29 is a transmission housing of the motor vehicle transmission 2, a part of the transmission housing or a component connected rotationally fixed thereto. In the transmission housing of the motor vehicle transmission 2, besides components of the motor vehicle transmission 2 itself the two electric machines 3 and 4 are preferably also accommodated. Owing to the rotationally fixed connection to the component 29 fixed to the housing, the tooth array 28 is also permanently static. Axial displacements of the coupling element 27 on the tooth array 28 be produced by means of an actuator—not shown—which is preferably in the form of an electro-mechanical actuator.

While still guided on the teeth 28 the coupling element 27 can be moved axially by the actuator to two different shift positions, such that in each of the shift positions the coupling element 27 engages with a respectively associated tooth array 30 or 31. The tooth array 30 is formed on the shaft 22 and is therefore in rotationally fixed connection with the second element E21 of the first planetary gearset P1 and the third element E32 of the second planetary gearset P2, whereas the tooth array 31 is provided rotationally fixed on the shaft 23 and is correspondingly also connected rotationally fixed to the third element E31 of the first planetary gearset P1.

By means of the shifting device 25 the function of two shifting elements A and B is reproduced, the respective actuated state of which moves the shifting device 25 to one of the shift positions of the coupling element 27 in each case. Thus, in a first shift position of the coupling element 27 an actuated state of the shifting element A is produced in which, while still engaged with the teeth 28, the coupling element 27 also engages with the tooth array 30. This results in a rotationally fixed connection between the shaft 22 and the component 29 fixed to the housing and therefore immobilizes the shaft 22 along with the second element E21 of the first planetary gearset P1 and the third element E32 of the second planetary gearset P2.

From the first shift position the coupling element 27 can be moved by the actuator to a neutral position, which is shown in FIG. 1 and in which the coupling element 27 is only engaged with the teeth 28. Thereby, in this neutral position no coupling is produced by the shifting device 25.

Besides moving the coupling element 27 to its first shift position the coupling element 27 can also be moved from the neutral position to a second shift position in which, while still engaged with the teeth 28, the coupling element 27 also engages with the tooth array 31. Thereby, the coupling element 27 connects the shaft 23 rotationally fixed to the component 29 fixed to the housing, which immobilizes the shaft 23 and with it also the third element E31 of the first planetary gearset P1. In this second shift position an actuated state of the shifting element B is reproduced.

The shifting device 26 too has a coupling element 32 in the form of a sliding sleeve, such that the coupling element 32 is guided in a rotationally fixed but axially displaceable manner on a tooth array 33 which is formed on the second drive input shaft 10. From the neutral position shown in FIG. 1, in which the coupling element 32 does not produce any coupling, the coupling element 32 can be moved axially by an associated actuator—not shown here—on the one hand to a first shift position.

In this first shift position, while still engaged with the tooth array 33 the coupling element also engages with a tooth array 34 which is formed on the shaft 23. Thereby, in the first shift position of the coupling element 32 a rotationally fixed connection is formed between the second drive input shaft 10 and the shaft 23, whereby the third element E31 of the first planetary gearset P1 is also connected rotationally fixed to the second drive input shaft 10. Thus, in the first shift position an actuated state of a shifting element D is reproduced.

On the other hand, however, the coupling element 32 can also be moved axially by the associated actuator to a second shift position in which, while still engaged with the teeth 33, the coupling element 32 also engages with a tooth array 35. This tooth array 35 is formed on the first drive input shaft 9, so that in the second shift position of the coupling element 32 a rotationally fixed connection between the two drive input shafts 9 and 10 is formed. This reproduces an actuated state of a shifting element E. Thus, the shifting device 25 realizes the functions of the two shifting elements D and E.

As can be seen in FIG. 1, The first drive input shaft 9, the second drive input shaft 10, the output shaft 11 and also the planetary gearsets P1 and P2 are arranged coaxially with one another, and in addition, besides the shafts 22 and 23 the two electric machines 3 and 4 are also positioned coaxially therewith. Axially after the electric machine 3 there follows first the electric machine 4, then the first planetary gearset P1, followed by the second planetary gearset P2 and finally the connection point 21 of the output shaft 11.

The shifting device 25 is positioned axially overlapping with the second planetary gearset P2 and radially surrounding the two planetary gearsets P1 and P2, whereas the shifting device 26 is positioned axially overlapping with the electric machine 4. The shifting device 26 is arranged axially between the connection point 24 and the first planetary gearset P1, and the shifting device 26 together with the two planetary gearsets P1 and P2 and the shifting device 25 are located radially inside relative to the two electric machines 3 and 4. Whereas the first drive input shaft 9 and the output shaft 11 are essentially solid shafts which in this case are arranged coaxially with and axially next to one another, the second drive input shaft 10 and also the shafts 23 and 24 are hollow shafts.

FIG. 2 shows a tabulated summary of various conditions I to VIII that can be obtained by means of the drive unit according to FIG. 1. In conditions I, II and VI a first gear G1 is engaged in the motor vehicle transmission 2 of the drive unit 1, for which purpose the coupling element 27 in the shifting device 25 is moves to its first shift position (actuated state of A). This immobilizes the shaft 22 so that the first drive input shaft 9 is coupled to the output shaft 11 by way of the second planetary gearset P2.

In condition I, in addition the coupling element 32 in the shifting device 26 is moved to its second shift position (actuated state of E), so that the second drive input shaft 10 is connected rotationally fixed to the first drive input shaft 9. Thereby, in the condition I the two electric machines 3 and 4 are connected in the first gear G1, whereby conjoint driving by the electric machines 3 and 4 can take place.

In contrast, in condition II, besides the positioning of the coupling element 27 of the shifting device 25 in its first shift position (actuated state of A) the coupling element 32 of the shifting device 26 is moved to its second shift position (actuate state of D), whereby the second drive input shaft 10 is connected rotationally fixed to the shaft 23. In that way the second drive input shaft 10 and so also the electric machine 4 are coupled to the first drive input shaft 9 via the first planetary gearset P1, so that the second drive input shaft 10 is then coupled by the first planetary gearset P1 and the second planetary gearset P2 to the output shaft 11 by way of an intermediate gear ZG.

In the condition VI, in contrast, the first drive input shaft 9 is coupled to the output shaft 11 and therefore only the electric machine 3 is connected, whereas the electric machine 4 is decoupled. For that, in the shifting device 26 the coupling element 32 must be moved to its neutral position while the coupling element 27 of the shifting device 25 is positioned in its first shift position (actuated state of A). In this way drag losses in the electric machine 4 can be avoided.

A second gear G2 is engaged in the motor vehicle transmission of the drive unit 1 by moving the coupling element 27 of the shifting device 25 to its second shift position (actuated state of B). This is done in each case in conditions IV, V and VII. In the second shift position of the coupling element 27 the shaft 23 is immobilized, which results in coupling the first drive input shaft 9 to the output shaft 11 via the two planetary gearsets P1 and P2.

In condition IV, in addition the coupling element 32 of the shifting device 26 is moved to its first shift position (actuated state of D) whereby the second drive input shaft 10 is connected rotationally fixed to the shaft 23. The shaft 23 is immobilized in the actuated state of the shifting element B, so the rotor 8 of the electric machine 4 is then also immobilized. In this case the electric machine 4 can be used for supporting a traction force when shifting in the shifting device 25 and also for synchronizing the shifting device 25.

In condition V, in contrast, in addition the coupling element 32 of the shifting device 26 is moved to its first shift position (actuated state of E), so that the two drive input shafts 9 and 10 are again connected rotationally fixed to one another. In that way the two drive input shafts 9 and 10 are coupled to the output shaft 11 in the second gear G2, so that the two electric machines 3 and 4 are also connected.

Furthermore, in the second gear G2 only the first drive input shaft 9 and thus only the electric machine 3 can be connected (condition VII), for which purpose, when the coupling element 27 of the shifting device 25 is positioned in its second shift position (actuated state of B), in the shifting device 26 the coupling element 32 must be restored to its neutral position again. The result is to decouple the electric machine 4 and thereby reduce drag losses.

In the condition III drive movements of the electric machines 3 and 4 are superimposed in a superimposition operating mode EDF, for which purpose, in the shifting device 26 the coupling element 32 is moved to its second shift position (actuated state of D), while the coupling element 27 of the shifting device 25 is in its neutral position. In that way the second drive input shaft 10 is connected rotationally fixed to the shaft 23 and hence also to the third element E31 of the first planetary gearset P1. Thereby, a rotation speed superimposition of the electric machines 3 and 4 by way of the two planetary gearsets P1 and P2 at the output shaft 11 is achieved.

In the superimposition operating mode EDF driving operation by means of the two electric machines 3 and 4 can also be carried out. Thus, the two electric machines 3 and 4 can for example have the same rotation speed, whereby the two planetary gearsets P1 and P2 are blocked and thus a solid through-drive of both drive input shafts 9 and 10 to the output shaft 11 takes place.

In the condition VIII, in contrast, the two drive input shafts 9 and 10 are decoupled from the output shaft 11 since in the shifting device 25 the coupling element 25 is in its neutral position and in the shifting device 26 the coupling element 32 is moved to its second shift position (actuated state of E). In that way, although the two drive input shafts

9 and 10 are connected rotationally fixed to one another, owing to the free rotation of the shaft 23 there is no coupling to the output shaft 11.

By virtue of an appropriate sequence of the conditions I to VIII, with the drive unit 1 a powershift can be carried out between the first gear G1 and the second gear G2: at the beginning, in condition I the two electric machines 3 and 4 are connected in the first gear G1. Next, in the shifting device 26 the coupling element 32 is moved from its second shift position (actuated state of E) to its first shift position (actuated stat of D), and during the shift a rotation speed synchronization is carried out in the second shifting element 26 by means of the second electric machine 4 and a traction force is supported in the first year G1 by the electric machine 3. This produces the condition II, in which the electric machine 4 is coupled to the output shaft 11 with a fixed rotation speed ratio. In some circumstances that could also be used as the driving condition for a longer time.

After that, in the shifting device 25 a load-free condition of the coupling element 27 is produced by setting a suitable torque ratio between the electric machines 3 and 4, and the coupling element 27 is then moved to its neutral position, whereby the condition III is produced. In this condition III the traction force is supported also in the superimposition operating mode EDF. In the superimposition operating mode EDF more prolonged driving operation is also possible.

Thereafter, the coupling element 27 is moved to its second shift position (actuated state of B), and for that purpose a rotation speed synchronization is carried out in the shifting device 25 by appropriate adjustment of a rotation speed of the electric machine 3. On completion of the shift the second gear G2 is engaged between the first drive input shaft 9 and the output shaft 11, and during this the second drive input shaft 10 and thus also the electric machine 4 are braked and the condition IV is produced.

For the eventual engagement of the second gear G2 between the two drive input shafts 9 and 10 and the output shaft 11, a shift is again carried out in the shifting device 26 whereby the electric machine 3 again supports the traction force. For this shift, by means of the electric machine 4 a rotation speed synchronization is carried out in the shifting device 26 such that when the shift is completed the condition V has been reached and thereby both electric machines 3 and 4 are connected.

A downshift under load from the second gear G2 to the first gear 21 can then take place by reversing the process described above.

Figure 3:
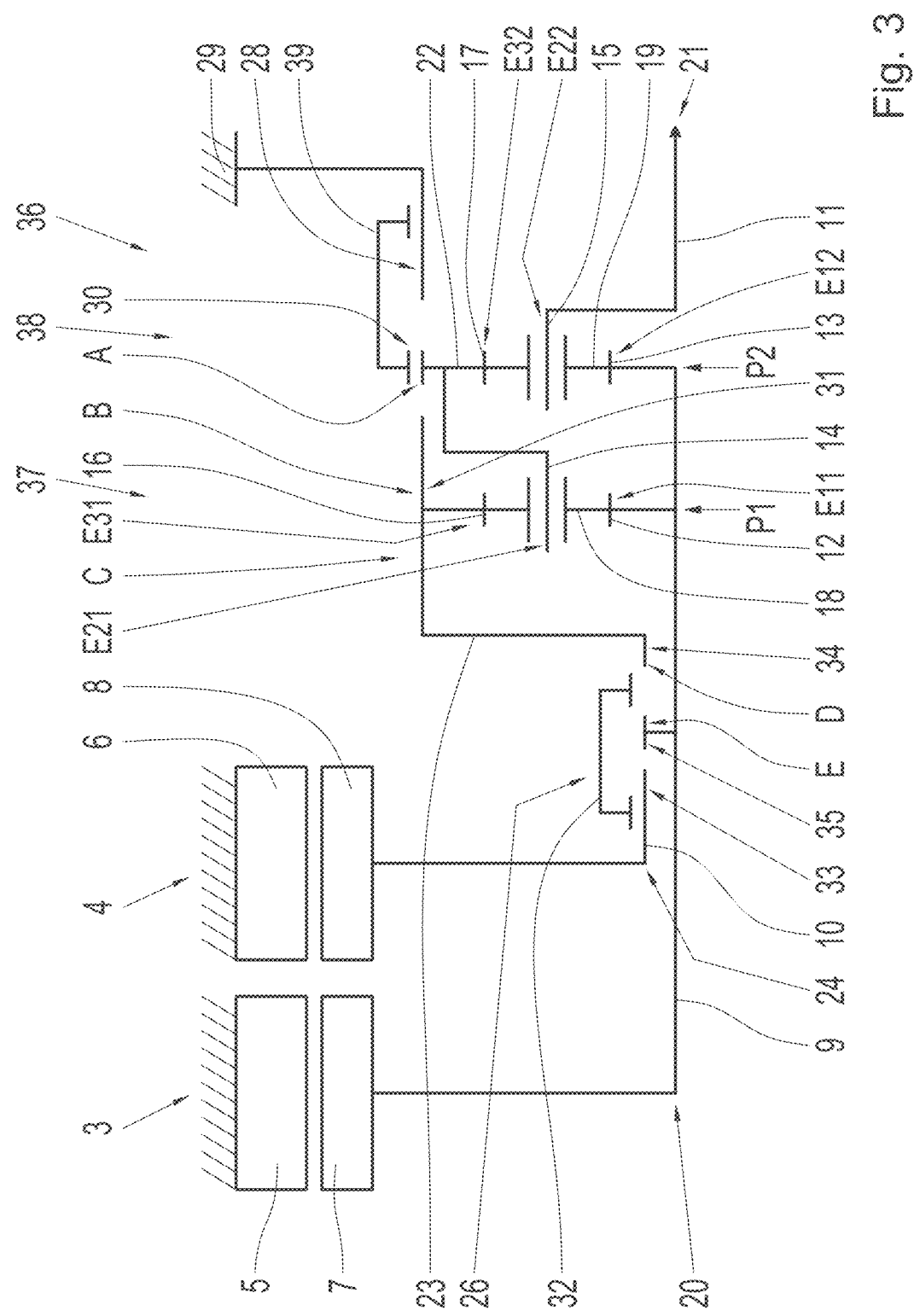
FIGS. 3 and 4: In each case a schematic representation of a respective drive unit that corresponds to a further design option of the invention.

Furthermore, FIG. 3 shows a schematic representation of a drive unit 36 configured in accordance with a further possible design of the invention. This drive unit 36 corresponds in large measure to the variant shown in FIG. 1, with the difference that in a motor vehicle transmission 37 of the drive unit 36 a shifting device 38 is provided in the drive unit 36 which, besides the functions of the shifting elements A and B also reproduces the function of a shifting element C. The shifting device 36 comprises a coupling element 39 which, by means of an actuator of the shifting device 38—not shown here—can be moved axially. In a first shift position shown in FIG. 3 the coupling element 39 produces an actuated state of the shifting element A and for that purpose is engaged on the one hand with the tooth array 28 and on the other hand with the tooth array 30. In a manner analogous to the variant in FIG. 1, the shaft 22 is thereby connected rotationally fixed to the permanently immobilized structural element 29 and is therefore itself immobilized.

From the first shift position the coupling element 39 of the shifting device 38 can then move to a first neutral position in which the coupling element 39 is engaged only with the teeth 28. Consequently, no coupling is formed by the coupling element 38. Besides a return to the first shift position the coupling element 38 can be moved axially, guided in a rotationally fixed manner on the teeth 28, to a second shift position in which the coupling element 38, while still engaged with the teeth 28, also engages with the tooth array 31. This produces the actuated state of the shifting element B and, analogously to the variant in FIG. 1, immobilizes the shaft 23.

On the one hand, from the second shift position the coupling element 39 can be moved back to the first neutral position, but by an axial displacement in the opposite direction the coupling element 39 can be moved to a second neutral position. This movement takes place by axially displaceable rotationally fixed guiding on the teeth 31, so that in the second neutral position the coupling element 39 is engaged only with the teeth 31 and does not therefore form any coupling. From the second neutral position the coupling element 39 can then on the one hand be returned to the second shift position, or alternatively, it can be moved axially to a third shift position in which the coupling element 39, while still engaged with the teeth 31, additionally engages with the tooth array 30. In that way the coupling element 39 connects the shaft 22 rotationally fixed to the shaft 23 which results in blocking of the two planetary gearsets P1 and P2 and constitutes an actuated state of the shifting element C. In other respects, the embodiment shown in FIG. 3 corresponds to the variant shown in FIG. 1, so that reference can be made to the description of the latter.

Figure 4:
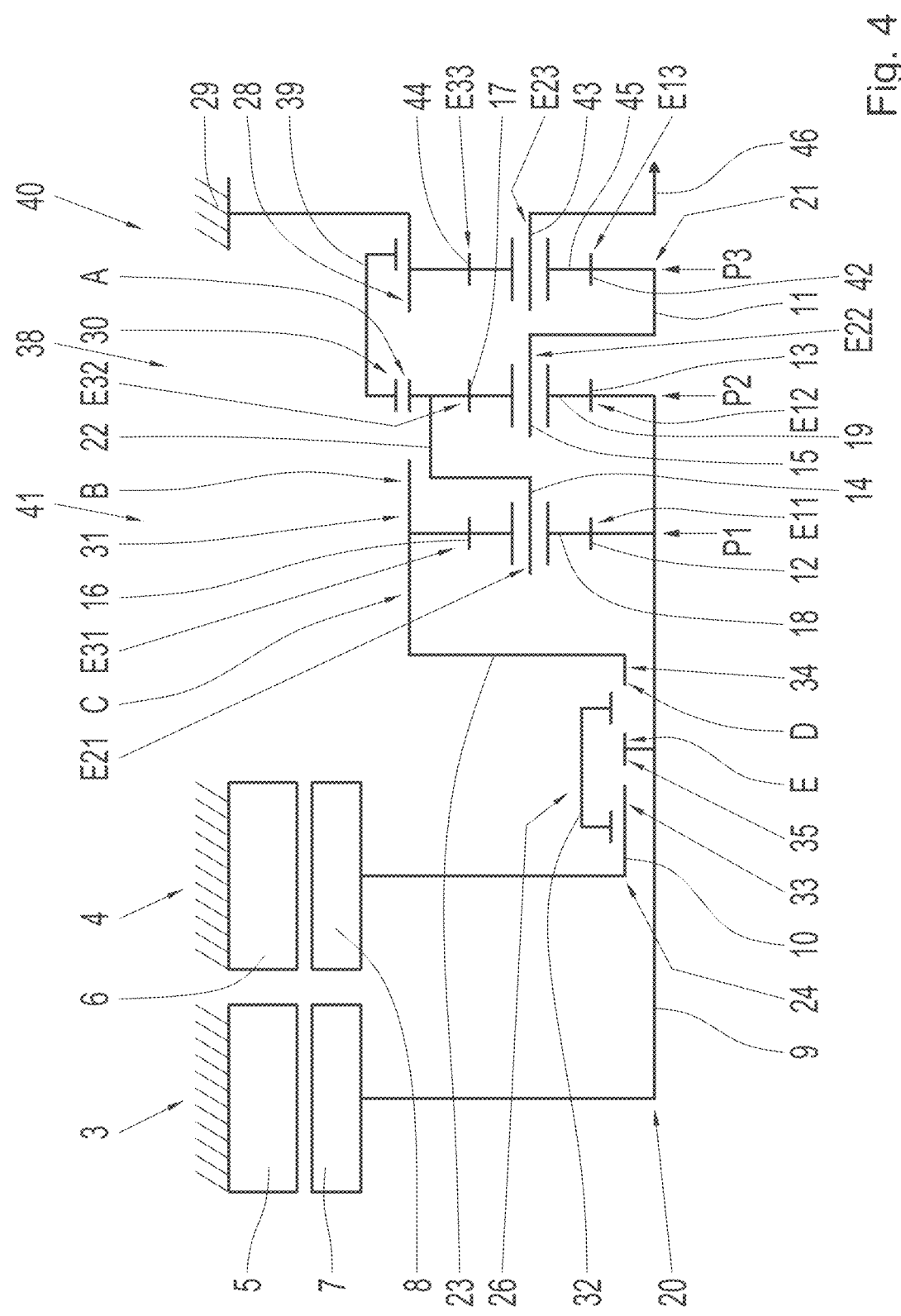

Furthermore, FIG. 4 shows a schematic view of a drive unit 40, this drive unit 40 corresponding to a further possible design of the invention. In this case the drive unit 40 corresponds essentially to the drive unit 36 shown in FIG. 3, but the drive unit 40 differs from the drive unit 36 in FIG. 3 in that, in a motor vehicle transmission 41 of the drive unit 40, a third planetary gearset P3 is now provided. The third planetary gearset P3 comprises a first element E13, a second element E23 and a third element E33, wherein the first element E13 of the third planetary gearset P3 is a sun gear 42, the second element E23 of the third planetary gearset P3 is a planetary carrier 43 and the third element E33 of the third planetary gearset P3 is a ring gear 44. On the planetary carrier 43 a number of planetary gearwheels 45 are mounted to rotate and these gearwheels mesh both with the sun gear 42 and with the ring gear 44. Thus, the third planetary gearset P3 is also a minus planetary gearset.

The third planetary gearset P3 is arranged on a side of the second planetary gearset P2 facing away from the first planetary gearset P1 and is positioned at the level of the connection point 21 of the output shaft 11. At its connection point 21 the output shaft 11 is connected rotationally fixed to the first element E13 of the third planetary gearset P3, while the third element E33 of the third planetary gearset P3 is connected rotationally fixed to the component 29 fixed to the housing and is therefore itself permanently immobilized. Finally, the second element E23 of the third planetary gearset P3 is connected rotationally fixed to a drive output shaft 47 which is arranged coaxially with the output shaft 11 and at the end thereof. Via the drive output shaft 46 the coupling to the differential gearset, in particular located downstream, can be formed. In this case the planetary gearset P3 produces a constant transmission ratio from the output shaft 11 to the drive output shaft 46. In other respects, the design option according to FIG. 4 corresponds to the variant shown in FIG. 3, so that reference can be made to the description of the latter.

FIG. 5 shows a tabulated summary of various conditions I' to XI' which can be obtained by means of the drive units 36 and 40 in FIGS. 3 and 4. In this case the conditions I' to XI' correspond in their realization and effect, in some cases to the conditions I to VIII in FIG. 2.

Thus, condition I' is identical to condition I in FIG. 2, condition II' is identical to condition II in FIG. 2, condition III is identical to condition III in FIG. 2, condition IV' is identical t condition IV in FIG. 2, condition V' is identical to condition V in FIG. 2, condition VIII' is identical to condition VI in FIG. 2, condition IX' is identical to condition VII in FIG. 2 and condition XI' is identical to condition VIII in FIG. 2, so that in each case reference can be made to the corresponding descriptions of FIG. 2. Furthermore, a powershift can be carried out from the first gear G1 to the second gear G2 in a manner analogous to that described for FIG. 2.

In addition, in the motor vehicle transmissions 37 and 41 of the drive units 36 and 40 a third gear can also be engaged by moving the coupling element 39 of the shifting device 38 to its third shift position (actuated state of C). This is done in the conditions VI', VII' and X'. In the third shift position the two planetary gearsets P1 and P2 are blocked so that the drive input shaft 9 is connected rotationally fixed to the output shaft 11 and a solid through-drive can take place from the electric machine 3 to the output shaft 11.

Moreover, in the condition VI' the coupling element 32 of the shifting device 26 is moved to its second shift position (actuated state of E), so that in addition the second drive input shaft 10 is connected rotationally fixed to the first drive input shaft 9. In that way, in the condition VI' both of the electric machines 3 and 4 are connected in the third gear G3 whereby a conjoint drive can take place by way of the electric machines 3 and 4.

In contrast, in the condition VII', besides positioning the coupling element 39 of the shifting device 38 in its third shift position (actuated state of C) the coupling element 32 of the shifting device 26 is moved to its first shift position (actuated state of D), whereby the second drive input shaft 10 is connected rotationally fixed to the shaft 23. In that way the second drive input shaft 10 and thus also the electric machine 4 are connected by way of the blocked planetary gearsets P1 and P2 rotationally fixed to the output shaft 11 and also to the first drive input shaft 9, so that again the third gear G3 is engaged between the two drive input shafts 9 and 10 and the output shaft 11.

In the condition X', on the other hand, only the first drive input shaft 9 is coupled to the output shaft 11 and thus also only the electric machine 3 is connected in the third gear G3, while the electric machine 4 is decoupled. For that purpose, the coupling element 32 of the shifting device 26 must be moved to its neutral position, while the coupling element 39 of the shifting device 38 is moved to its third shift position (actuated state of C). In that way drag losses in the electric machine 4 can be avoided.

With the drive units 36 and 40 a powershift can also be carried out from the second gear 02 to the third gear G3. The starting position for this is the condition V' in which the two electric machines 3 and 4 are connected in the second gear G2. First, in the motor vehicle transmission 37 or 41 concerned, in the shifting device 26 the coupling element 32 is shifted from its second shift position (actuated state of E) to its first shift position (actuated state of D), and during the course of that shift the traction force is supported by the electric machine 3 in the second gear G2. When the shift has been completed the condition IV' has been reached, in which the electric machine 4 is at rest.

After that, by producing an appropriate torque ratio of the electric machines 3 and 4 the coupling element 39 in the shifting device 38 is made load-free, and thereupon the coupling element 39 is moved from its second shift position (actuated state of B) to its second neutral position. Thereby, by virtue of condition III' the superimposition operating mode has been produced.

Thereafter, the electric machines 3 is brought to the same rotation speed as the electric machine 4, whereby the two planetary gearsets P1 and P2 are rotating as a block. This also results in a rotation speed synchronization in the shifting device 38 in relation to the third gear G3, so that the coupling element 39 can now be moved to its third shift position (actuated state of C) and consequently, on reaching the condition VII', the third gear G3 is engaged between the drive input shaft 9 and the output shaft 11. In addition, still in the shifting device 26, a shift can be carried out from the first shift position (actuated state of D) to the second shift position (actuated state of E), whereby the condition VI' is reached.

A downshift from the third gear G3 to the second gear G2 can be carried out by the reverse process, wherein however a downshift can also be carried out with interruption of the traction force if, with the coupling element 32 still in its second position (actuated state of E), in the shifting device 38 a change is made with rotation speed synchronization from the third shift position (actuated state of C) to the second shift position (actuated state of B).

Figure 6:
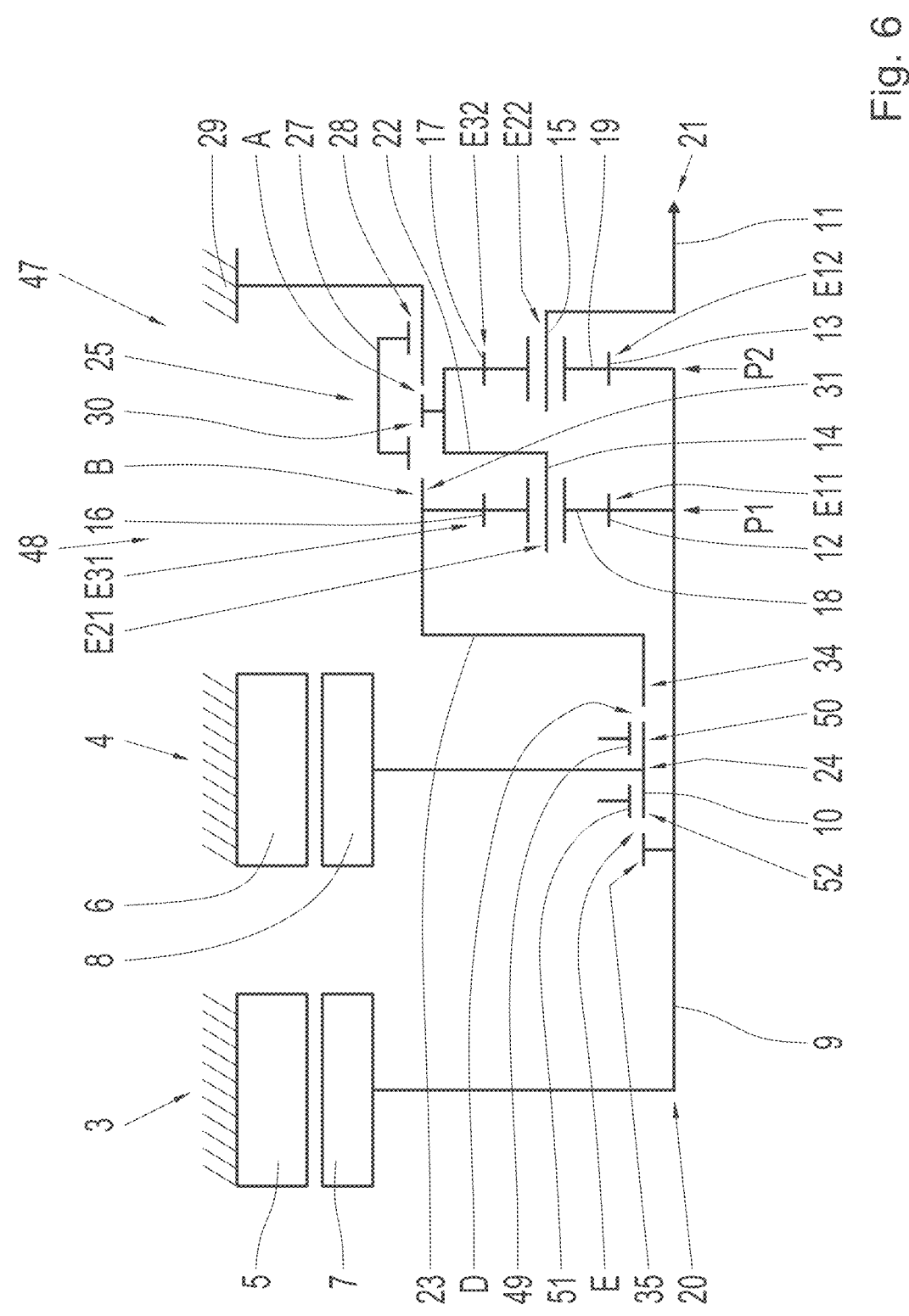
FIG. 6: A schematic view of a drive unit according to a further embodiment of the invention.

Furthermore, FIG. 6 shows a schematic view of a drive unit 47 that corresponds to another embodiment of the invention. This embodiment corresponds in large measure to the variant shown in FIG. 1, wherein in a motor vehicle transmission 48 of the drive unit 47, otherwise than in the variant shown in FIG. 1, the shifting elements D and E are now in the form of individual shifting elements. In this case the shifting elements D and E are each interlocking shifting elements in the form of claw-type shifting elements. For the shifting element D, a coupling element 49 is now provided, which is guided rotationally fixed and in an axially displaceable manner on a tooth array 50 which is formed on the second drive input shaft 10. To actuate the shifting element D, the coupling element 49 can be moved axially by an actuator—not shown here—to a shift position in which the coupling element 49, while still engaged with the teeth 50, also engages with the teeth 34 formed on the shaft 23. Correspondingly, with the motor vehicle transmission 48 as well a rotationally fixed connection is formed between the drive input shaft 10 and the shaft 23 when the shifting element D is actuated.

The shifting element E has a coupling element 51 which is guided rotationally fixed and axially displaceably on a tooth array 52, which is also formed on the second drive input shaft 10. From a neutral position shown in FIG. 6 which defines an inactive state of the shifting element E, the coupling element 51 can be moved axially to a shift position in which the coupling element 51, while still engaged with the teeth 52, also engages with the teeth 35. This results in a rotationally fixed connection of the drive input shaft 10 to the drive input shaft 9.

Whereas the shifting element D is provided between the connection point 24 of the drive input shaft 10 and the first planetary gearset P1, the shifting element E is positioned axially between the connection point 24 of the drive input shaft 10 and the connection point 20 of the drive input shaft 9. In other respects, the embodiment shown in FIG. 6 corresponds to the variant according to FIG. 1, so that reference can be made to the description of the latter.

FIG. 7 now shows a tabular summary of various conditions I" to IX" of the drive unit 47 in FIG. 6. In this case the conditions I' to V" correspond essentially to conditions I' to V' according to FIG. 5, in each case with the only difference that the shifting device 25 produces the actuated states of A and B and a respective actuated state of D or E directly by the individual shifting element D or E concerned.

In a condition VI" of the drive unit 47 in FIG. 3, in the motor vehicle transmission 48 a third gear G3 can additionally be engaged between the drive input shafts 9 and 10 and the output shaft 11, and to do this the individual shifting elements D and E are actuated at the same time. In this case, from the second gear G2 engaged between the drive input shafts 9 and 10 and the output shaft 11 (condition V"), a powershift can be carried out into the third gear G3 by opening the shifting element E and thereafter actuating the shifting element D, while during the course of those shifts the traction force is supported by the electric machine 3 in the second gear G2. When the shifts have been completed the condition IV" has been reached, in which the electric machine 4 is at rest.

Next, in the shifting device 25 a load-free condition of the coupling element 27 is produced by setting an appropriate torque ratio of the electric machines 3 and 4, and then moving the coupling element 27 from its second shift position (actuated state of B) to its second neutral position. This produces the condition III" and the superimposition operating mode EDF is established.

After that, the electric machine 3 is brought to the same rotation speed as the electric machine 4, whereby the two planetary gearsets P1 and P2 rotate as a block. When the block rotation of the two planetary gearsets P1 and P2 is reached, then in addition the shifting element E and the shifting element D are actuated and thereby the condition VI" is produced.

Finally, in the drive unit 47 as well the conditions VII", VIII" and IX" can be obtained. In condition VII" only the first drive input shaft 9 is coupled to the output shaft 11 in the first gear G1, since in the shifting device 25 the coupling element 27 is positioned in its first shift position (actuated state of A). When the condition VIII" is produced, the first drive input shaft is again coupled to the output shaft 11, this time in the second gear G2. For that, in the shifting device 25 the coupling element 27 must be moved to its second position (actuated state of B). Thereby, respective drag losses in the electric machines can be avoided. Finally, when the condition IX" is produced both drive input shafts 9 and 10 are decoupled from the output shaft 11 since only the shifting element E is actuated.

Figure 8:
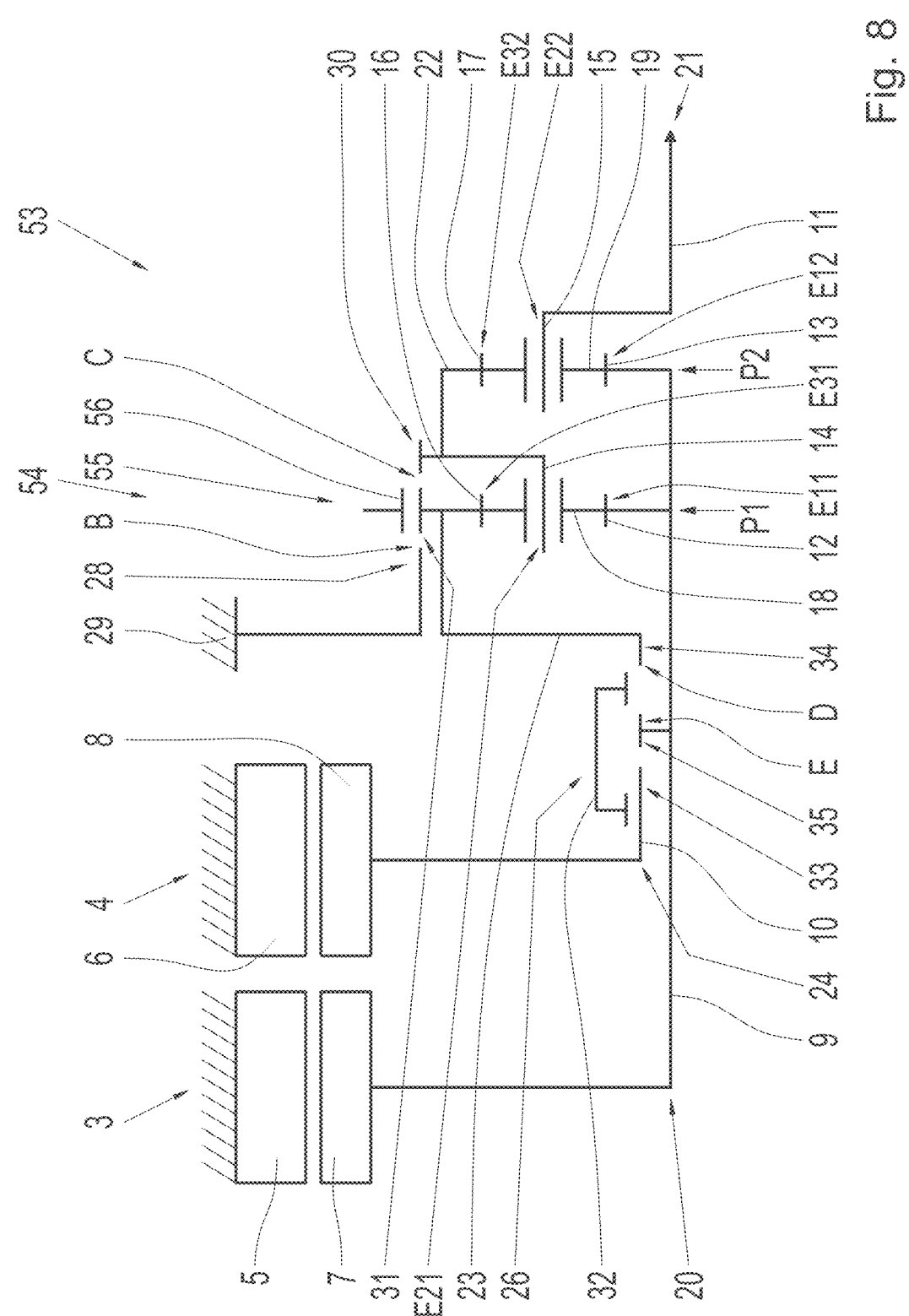
FIG. 8: A schematic representation of a drive unit corresponding to a further possible design of the invention.

Furthermore, FIG. 8 shows a schematic representation of a drive unit 53 configured in accordance with a further possible design of the invention. The drive unit 53 corresponds in large measure to the drive unit 36 in FIG. 3, with the difference that in a motor vehicle transmission 54 of the drive unit 53 in this case a shifting device SS reproduces only the functions of the shifting elements B and C. The shifting device SS has a coupling element 56 which is guided rotationally fixed and axially movably on the teeth 31 and thus on the shaft 23, wherein the coupling element 56 can be moved axially by an actuator—not shown here. From a neutral position shown in FIG. 8, the coupling element 56 can on the one hand be moved to a first shift position in which, while still engaged with the teeth 31, it also engages in the teeth 28 which are connected rotationally fixed to the component 29 fixed to the housing. This results in immobilization of the shaft 23 and corresponds to the actuated state of the shifting element B.

On the other hand, the coupling element 56 can be moved out of its neutral position in the opposite axial direction to a second shift position in which, while still engaged with the teeth 31, the coupling element additionally engages with the teeth 30. Again, the teeth 30 are connected rotationally fixed on the shaft 22, so that in the second shift position of the coupling element 56 the shafts 22 and 23 are connected rotationally fixed to one another. This corresponds to the actuated state of the shifting element C. In this case the shifting device 55 is positioned axially overlapping and radially surrounding the first planetary gearset P1. In other respects, the embodiment according to FIG. 8 corresponds to the variant shown in FIG. 3, so that reference can be made to the description thereof.

FIG. 9 shows a table summarizing various condition I''' to VII''' of the drive unit 53 in FIG. 8. In this case the condition I''' corresponds essentially to the condition V' in FIG. 5, the condition II''' essentially to the condition IX' in FIG. 5, the condition III''' essentially to the condition III' in FIG. 5, the condition IV''' essentially to the condition X' in FIG. 5, the condition V''' essentially to the condition IX' in FIG. 5, the condition VI''' essentially to the condition VII' in FIG. 5 and the condition VII''' essentially to the condition VI' in FIG. 5, in each case where appropriate with the single difference that now the shifting device 55 produces the respective actuated states of the shifting elements B and C. Accordingly, in relation to the above reference can be made to the relevant description of FIG. 5. A powershift can also be carried out between the second gear G2 and the third gear G3 analogously to the manner described in connection with FIG. 5.

Figure 10:
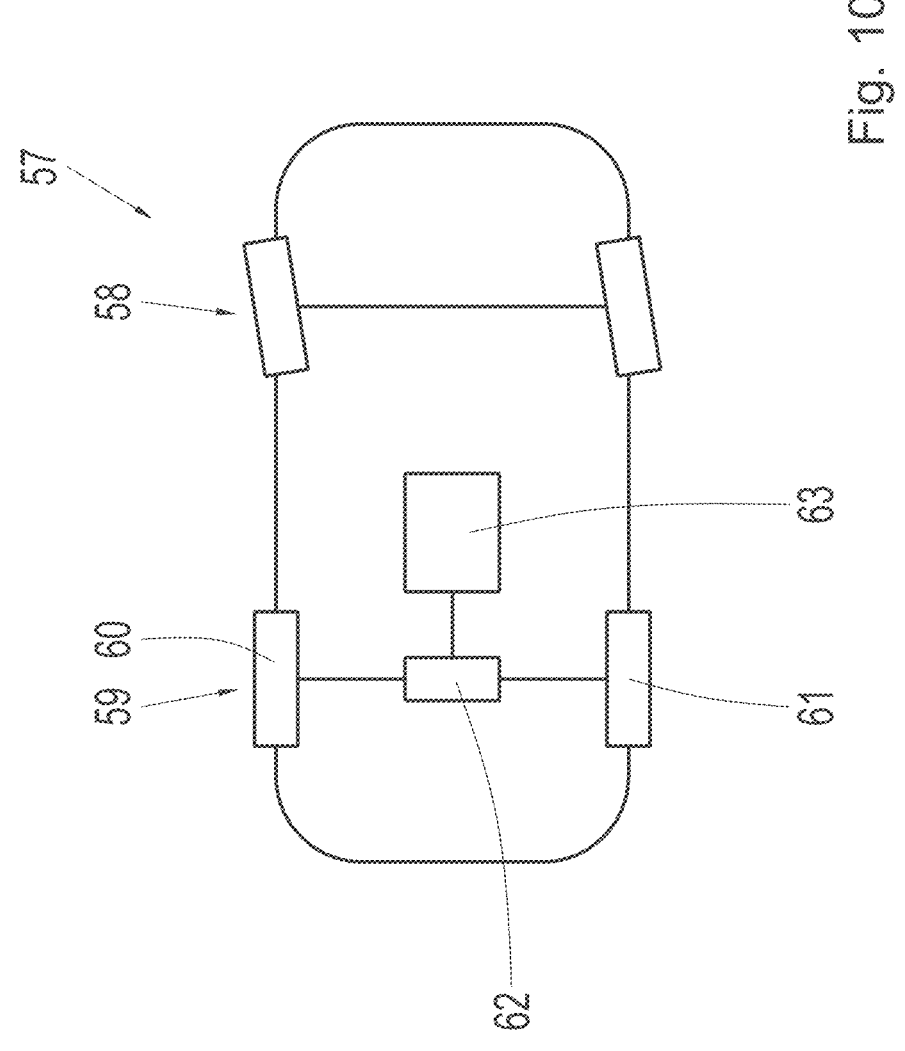
FIG. 10: A schematic view of an electric vehicle corresponding to a preferred embodiment of the invention.

Finally, FIG. 10 shows a schematic view of an electric vehicle 57. Besides a steerable, non-driven vehicle axle 58, the electric vehicle 57 has a motor vehicle drive axle 59 with drive wheels 60 and 61. The drive wheels 60 and 61 are connected via a differential gearset 62 to a drive unit 63 which corresponds to one of the drive unit variants 1, 36, 40, 47 and 53.

Whereas the vehicle axle 58 is a front axle, the motor vehicle drive axle 59 is a rear axle of the electric vehicle 57. However, alternatively or in addition to the motor vehicle drive axle 59 the vehicle axle 58 too could also be designed as a driven axle with a drive unit of analogous structure if needs be.

By virtue of the designs according to the invention a compactly built motor vehicle transmission can be provided, with which a suitable connection of two drive machines is possible.

INDEXES

1 Drive unit
2 Motor vehicle transmission
3 Electric machine
4 Electric machine
5 Stator
6 Stator
7 Rotor
8 Rotor
9 Drive input shaft
10 Drive input shaft
11 Output shaft
12 Sun gear
13 Sun gear
14 Planetary carrier
15 Planetary carrier
16 Ring gear
17 Ring gear 18 Planetary gearwheel
19 Planetary gearwheel
20 Connection point
21 Connection point
22 Shaft
23 Shaft
24 Connection point
25 Shifting device
26 Shifting device
27 Coupling element
28 Tooth array
29 Component fixed to the housing
30 Tooth array
31 Tooth array
32 Coupling element
33 Tooth array
34 Tooth array
35 Tooth array
36 Drive unit
37 Motor vehicle transmission
38 Shifting device
39 Coupling element
40 Drive unit
41 Motor vehicle transmission
42 Sun gear
43 Planetary carrier
44 Ring gear
45 Planetary gearwheel
46 Drive output shaft
47 Drive output shaft
48 Motor vehicle transmission
49 Coupling element
50 Tooth array
51 Coupling element
52 Tooth array
53 Drive unit
54 Motor vehicle transmission
55 Shifting device
56 Coupling element
57 Electric vehicle
58 Vehicle axle
59 Motor vehicle drive axle
60 Drive wheel
61 Drive wheel
62 Differential gearset
63 Drive unit
P1 First planetary gearset
P2 Second planetary gearset
P3 Third planetary gearset
E11 First element of the first planetary gearset
E21 Second element of the first planetary gearset
E31 Third element of the first planetary gearset
E12 First element of the second planetary gearset
E22 Second element of the second process gearset
E32 Third element of the second planetary gearset
E13 First element of the third planetary gearset
E23 Second element of the third planetary gearset
E33 Third element of the third planetary gearset
A Shifting element
B Shifting element
C Shifting element
D Shifting element
E Shifting element
G1 Gear
G2 Gear
G3 Gear
ZG Intermediate gear EDF Superimposition operating mode
I to VIII Conditions
I' to XI' Conditions
I" to IX" Conditions
I'" to VII'" Conditions

The invention claimed is:

1. A motor vehicle transmission for an at least partially electrically driven motor vehicle, comprising:
a first drive input shaft configured to be coupled to a first drive machine;
a second drive input shaft configured to be coupled to a second drive machine;
an output shaft; and
a first planetary gearset and a second planetary gearset;
a first shifting element, a second shifting element, and a third shifting element;
wherein each of the first planetary gearset and the second planetary gearset has a first element, a second element, and a third element, in the form, respectively, of a sun gear, a planetary carrier, and a ring gear;
wherein the first element of the first planetary gearset and the first element of the second planetary gearset are connected rotationally fixed to the first drive input shaft;
wherein the second element of the second planetary gearset is connected rotationally fixed to the output shaft;
wherein the second element of the first planetary gearset and the third element of the second planetary gearset are connected rotationally fixed to one another;
wherein the first shifting element is configured, when in an actuated state, to immobilize the third element of the first planetary gearset,
the second drive input shaft configured to be coupled to the second drive machine;
wherein the second shifting element is configured, when in an actuated state, to connect the second drive input shaft rotationally fixed to the third element of the first planetary gearset; and
the third shifting element configured, when in an actuated state, to connect the second drive input shaft rotationally fixed to the first drive input shaft.

2. The motor vehicle transmission according to claim 1, further comprising a further shifting element, which is configured, when in an actuated state, to immobilize the second element of the first planetary gearset and the third element of the second planetary gearset.

3. The motor vehicle transmission according to claim 2, wherein the first shifting element and the further shifting element are formed by a common shifting device having a coupling element configured to be moved to a first shift position and to a second shift position, such that in the first shift position the coupling element functionally reproduces the actuated state of the first shifting element and immobilizes the third element of the first planetary gearset, and in the second shift position, the coupling element functionally reproduces the actuated state of the further shifting element and immobilizes the second element of the first planetary gearset and the third element of the second planetary gearset.

4. The motor vehicle transmission according to claim 3, further comprising:
a first tooth array, a second tooth array, and a third tooth array;
wherein in the first and second shift positions and when moving axially between its the first and second shift positions, the coupling element is guided by the first tooth array in a rotationally fixed and axially displaceable manner, the first tooth array being fixed;

wherein when the coupling element, while still engaged with the first tooth array, is in its first shift position the coupling element engages additionally in the second tooth array which is connected rotationally fixed to the third element of the first planetary gearset; and wherein when the coupling element, while still engaged with the first tooth array, is in its second shift position it engages additionally in the third tooth array which is connected rotationally fixed to the second element of the first planetary gearset and the third element of the second planetary gearset.

5. The motor vehicle transmission according to claim 2, further comprising:

an additional shifting element, which is configured, when in an actuated state, to connect two of the elements of the first planetary gearset rotationally fixed to one another, or two of the elements of the second planetary gearset rotationally fixed to one another, or to connect the third element of the first planetary gearset and the third element of the second planetary gearset rotationally fixed to one another.

6. The motor vehicle transmission according to claim 5, wherein:

the first shifting element, the further shifting element, and the additional shifting element are formed by a common shifting device which has a coupling element, such that the coupling element can be moved to a first shift position, a second shift position, and a third shift position;

in its first shift position the coupling element functionally reproduces the actuated state of the further shifting element and immobilizes the second element of the first planetary gearset and the third element of the second planetary gearset;

in its second shift position the coupling element functionally reproduces the actuated state of the first shifting element and immobilizes the third element of the first planetary gearset; and in its third shift position the coupling element functionally reproduces the actuated state of the additional shifting element and connects the second element of the first planetary gearset and the third element of the second planetary gearset rotationally fixed to the third element of the first planetary gearset.

7. The motor vehicle transmission according to claim 6, wherein:

in its first and second shift positions and when moving axially between its first and second shift positions, the coupling element is guided in a rotationally fixed and axially displaceable manner on the first tooth array which is fixed, so that in its first shift position, while still being engaged with the first tooth array, the coupling element additionally engages with the second tooth array which is connected rotationally fixed to the second element of the first planetary gearset and the third element of the second planetary gearset;

in its second shift position the coupling element, while still engaged with the first tooth array, additionally engages with the third tooth array which is connected rotationally fixed to the third element of the first planetary gearset, and when it is displaced axially between its second and third shift positions the coupling element is guided rotationally fixed and axially displaceably on the third tooth array; and in its third shift position, while still engaged with the third tooth array the coupling element additionally engages with the second tooth array.

8. The motor vehicle transmission according to claim 5, wherein the first shifting element and the additional shifting element are formed by a common shifting device which comprises a coupling element, such that the coupling element can be moved to a first shift position and to a second shift position, wherein the coupling element in its first shift position functionally reproduces the actuated state of the first shifting element and immobilizes the third element of the first planetary gearset, and in its second shift position the coupling element functionally reproduces the actuated state of the additional shifting element and connects the second element of the first planetary gearset and the third element of the second planetary gearset rotationally fixed to the third element of the first planetary gearset.

9. The motor vehicle transmission according to claim 8, wherein:

in its first and second shift positions and when moving between its first and second shift positions, the coupling element is guided in a rotationally fixed and axially displaceable manner on the first tooth array which is connected rotationally fixed to the third element of the first planetary gearset;

in its first shift position, while still engaged with the first tooth array the coupling element additionally engages with the second tooth array which is immobilized; and in its second shift position, while still engaged with the first tooth array the coupling element additionally engages with the third tooth array which is connected rotationally fixed to the second element of the first planetary gearset and the third element of the second planetary gearset.

10. The motor vehicle transmission according to claim 1, wherein the second shifting element and the third shifting element are formed by a common shifting device which has a coupling element, such that the coupling element can be moved to a first and to a second shift position, wherein the coupling element in its first shift position functionally reproduces the actuated state of the second shifting element and connects the second drive input shaft rotationally fixed to the third element of the first planetary gearset, and in its second shift position the coupling element functionally reproduces the actuated state of the third shifting element and connects the second drive input shaft rotationally fixed to the first drive input shaft.

11. The motor vehicle transmission according to claim 10, wherein:

in its first and second shift positions and when moving axially between its two shift positions, the coupling element is guided in a rotationally fixed and axially displaceable manner on a first tooth array which is connected rotationally fixed to the second drive input shaft;

in its first shift position, while still engaged with the first tooth array, the coupling element additionally engages with a second tooth array which is connected rotationally fixed to the third element of the first planetary gearset; and in its second shift position, while still engaged with the first toot array, the coupling element additionally engages with a third tooth array which is connected rotationally fixed to the first drive input shaft.

12. The motor vehicle transmission according to claim 1, wherein the second shifting element and the third shifting element are in the form of individual shifting elements.

13. The motor vehicle transmission according to claim 1, further comprising:

a third planetary gearset having a first element, a second element, and a third element, respectively in the form of a sun gear, a planetary carrier, and a ring gear, wherein one of the elements of the third planetary gearset is connected rotationally fixed to the output shaft, one of the elements of the third planetary gearset is connected rotationally fixed to a drive output shaft, and one of the elements of the third planetary gearset is immobilized.

14. A drive unit for an at least partially electrically driven motor vehicle, comprising a first electric machine, a second electric machine and the motor vehicle transmission according to claim 1, wherein a rotor of the first electric machine is coupled to the first drive input shaft and a rotor of the second electric machine is coupled to the second drive input shaft of the motor vehicle transmission.

15. A motor vehicle drive axle for a hybrid or electric vehicle, comprising the drive unit according to claim 14.

16. A hybrid or electric vehicle, comprising at least one motor vehicle drive axle according to claim 13 or at least one drive unit according to claim 14.

17. A method for processing a motor vehicle transmission according to claim 1, the method comprising:

engaging a gear in the motor vehicle transmission between the first drive input shaft and the output shaft by producing the actuated state of the first shifting element;

wherein engaging the gear includes producing the actuated states of the first shifting element and the third shifting element at the same time.

18. The method according to claim 17, comprising producing only the actuated state of the second shifting element, thereby producing a superimposition operating mode of the drive input shafts at the first planetary gearset and the second planetary gearset.

19. The method according to claim 18, comprising:

providing the motor vehicle transmission further comprising a further shifting element, the further shifting element configured, when in an actuated state, to immobilize the second element of the first planetary gearset and the third element of the second planetary gearset;

engaging a further gear in the motor vehicle transmission between the first drive input shaft and the output shaft by producing the actuated state of the further shifting element, wherein engaging the further gear between the two drive input shafts and the output shaft includes producing the actuated states of the further shifting element and the third shifting element at the same time; and engaging an intermediate gear between the second drive input shaft and the output shaft by producing the actuated states of the further shifting element and the second shifting element at the same time.

20. The method according to claim 18, comprising:

providing the motor vehicle transmission having an additional shifting element, the additional shifting element configured, when in an actuated state, to connect two of the elements of the first planetary gearset rotationally fixed to one another, or two of the elements of the second planetary gearset rotationally fixed to one another, or to connect the third element of the first planetary gearset and the third element of the second planetary gearset rotationally fixed to one another; and engaging an additional gear in the motor vehicle transmission between the first drive input shaft and the output shaft producing the actuated state of the additional shifting element, wherein engaging the additional gear includes producing the actuated states of the additional shifting element and the second shifting element or the third shifting element at the same time.

21. The method according to claim 17, comprising:

providing the motor vehicle transmission wherein the second shifting element and the third shifting element are in the form of individual shifting elements; and engaging an additional gear between the first and second drive input shafts and the output shaft by producing the actuated states of the second shifting element and the third shifting element at the same time.

22. A method for operating a drive unit for an at least partially electrically driven motor vehicle, the drive unit comprising a first electric machine, a second electric machine and the motor vehicle transmission according to claim 1, wherein a rotor of the first electric machine is coupled to the first drive input shaft and a rotor of the second electric machine is coupled to the second drive input shaft of the motor vehicle transmission, the method comprising:

engaging a gear in the motor vehicle transmission between the first drive input shaft and the output shaft by producing the actuated state of the first shifting element, wherein engaging the gear includes producing the actuated states of the first shifting element and the third shifting element at the same time;

wherein between a condition in which, in the motor vehicle transmission, the gear is engaged between the first and second drive input shafts and the output shaft, and a condition in which, in the motor vehicle transmission, the superimposition operating mode is produced, a powershift can be carried out either by shifting between the second shifting element and the third shifting element, and for that purpose carrying out a rotation speed synchronization at the third shifting element and at the second shifting element by means of the second electric machine while a traction force is supported by the first electric machine, or changing from an actuated to an inactive state of the first shifting element and for that purpose producing a load-free condition of the first shifting element by interaction of the two electric machines.

23. The method according to claim 22, comprising:

providing the motor vehicle transmission having a further shifting element, which is configured, when in an actuated state, to immobilize the second element of the first planetary gearset and the third element of the second planetary gearset;

wherein between the condition in which, in the motor vehicle transmission, the superimposition operating mode has been produced, and a condition in which, in the motor vehicle transmission the further gear is engaged between the two drive input shafts and the output shaft, a powershift can be carried out either by switching between the second shifting element and the third shifting element, and for that purpose a rotation speed synchronization is carried out at the third shifting element and at the second shifting element by means of the second electric machine, and a traction force is supported by the first electric machine, or a switch-over is carried out between an actuated and an inactive state of the further shifting element, and for that purpose a load-free condition is produced at the further shifting element by interaction between the two electric machines.

24. The method according to claim 23, wherein between the condition in which, in the motor vehicle transmission, the superimposition operating mode has been produced, and a condition in which the additional gear is engaged between the two drive input shafts and the output shaft, a powershift can be carried out by changing between an actuated and an inactive state of the additional shifting element and for that purpose producing a load-free condition of the additional shifting element by interaction of the two electric machines.

* * * * *